(12) United States Patent
Kawarada

(10) Patent No.: US 12,689,826 B2
(45) Date of Patent: Jul. 21, 2026

(54) IMAGE PICKUP APPARATUS, ITS CONTROL METHOD, AND STORAGE MEDIUM

(71) Applicant: CANON KABUSHIKI KAISHA, Tokyo (JP)

(72) Inventor: Masahiro Kawarada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 18/802,052

(22) Filed: Aug. 13, 2024

(65) Prior Publication Data

US 2025/0080841 A1 Mar. 6, 2025

(30) Foreign Application Priority Data

Aug. 29, 2023 (JP) ................................. 2023-138540

(51) Int. Cl.
| | |
|---|---|
| *H04N 23/67* | (2023.01) |
| *G06T 7/571* | (2017.01) |
| *G06T 7/80* | (2017.01) |
| *H04N 23/60* | (2023.01) |
| *H04N 23/61* | (2023.01) |
| *H04N 23/71* | (2023.01) |

(52) U.S. Cl.
CPC ........... *H04N 23/672* (2023.01); *H04N 23/61* (2023.01); *H04N 23/64* (2023.01); *H04N 23/71* (2023.01)

(58) Field of Classification Search
CPC ...... H04N 23/672; H04N 23/61; H04N 23/71;

H04N 23/64; H04N 23/611; H04N 23/67; H04N 23/673; G06T 7/80; G06T 7/571; G06T 2207/10148; G06T 2207/30168
See application file for complete search history.

(56) References Cited

U.S. PATENT DOCUMENTS

| | | | |
|---|---|---|---|
| 9,729,774 B2 | 8/2017 | Ueda | |
| 11,240,420 B2 * | 2/2022 | Kamba | ................. G02B 7/282 |
| 12,513,394 B2 * | 12/2025 | Koiwai | ............... H04N 23/671 |
| 2013/0162784 A1 * | 6/2013 | Ueda | .................... H04N 23/673 |
| | | | 348/49 |
| 2016/0094781 A1 * | 3/2016 | Ebato | .................... H04N 23/635 |
| | | | 348/345 |
| 2019/0325609 A1 * | 10/2019 | Kawarada | ............ H04N 23/663 |
| 2021/0304440 A1 * | 9/2021 | Kawarada | ............ H04N 23/663 |
| 2025/0355223 A1 * | 11/2025 | Nitto | ........................ G02B 7/06 |

FOREIGN PATENT DOCUMENTS

| | | |
|---|---|---|
| JP | 2013-130674 A | 7/2013 |
| JP | 2014-134697 A | 7/2014 |

* cited by examiner

*Primary Examiner* — Marly S Camargo
(74) *Attorney, Agent, or Firm* — Venable LLP

(57) ABSTRACT

An image pickup apparatus includes an imaging unit configured to capture an object image formed by each of a first optical system and a second optical system arranged in parallel with the first optical system, the first optical system and the second optical system being included in a compound-eye optical system, and a processor configured to detect a defocus amount of each of the first optical system and the second optical system regarding the object image, and evaluate an imaging state regarding the object image by setting a first reference value that is used to determine an in-focus state of the first optical system and a second reference value that is used to determine an in-focus state of the second optical system according to the imaging state.

17 Claims, 13 Drawing Sheets

202

IC_R                 IC_L h v

ML         A        B

IMAGE PICKUP APPARATUS, ITS CONTROL METHOD, AND STORAGE MEDIUM

BACKGROUND

Technical Field

One of the aspects of the embodiments relates to an image pickup apparatus, a control method of the image pickup apparatus, and a storage medium.

Description of Related Art

Japanese Patent Laid-Open No. 2013-130674 discloses an image pickup apparatus that includes an imaging optical system for a left-eye image and an imaging optical system for a right-eye image, and can perform focusing by independently controlling each imaging optical system. Japanese Patent Laid-Open No. 2014-134697 discloses an image pickup apparatus that includes a first image pickup apparatus and a second image pickup apparatus, and detects an in-focus position of an object based on contrast information output from the first image pickup apparatus.

The image pickup apparatuses disclosed in Japanese Patent Laid-Open Nos. 2013-130674 and 2014-134697 may cause a difference in imaging condition in each optical system in a compound-eye optical system due to various factors. Thus, even if focus detection is performed for the same object in each optical system, a proper in-focus determination result may not be obtained.

SUMMARY

An image pickup apparatus according to one aspect of the disclosure includes an imaging unit configured to capture an object image formed by each of a first optical system and a second optical system arranged in parallel with the first optical system, the first optical system and the second optical system being included in a compound-eye optical system, and a processor configured to detect a defocus amount of each of the first optical system and the second optical system regarding the object image, and evaluate an imaging state regarding the object image by setting a first reference value that is used to determine an in-focus state of the first optical system and a second reference value that is used to determine an in-focus state of the second optical system according to the imaging state. A control method of the above image pickup apparatus also constitutes another aspect of the disclosure. A storage medium storing a program for causing a computer to execute the above control method also constitutes another aspect of the disclosure.

Further features of various embodiments of the disclosure will become apparent from the following description of embodiments with reference to the attached drawings.

DESCRIPTION OF THE EMBODIMENTS

Figure 1:
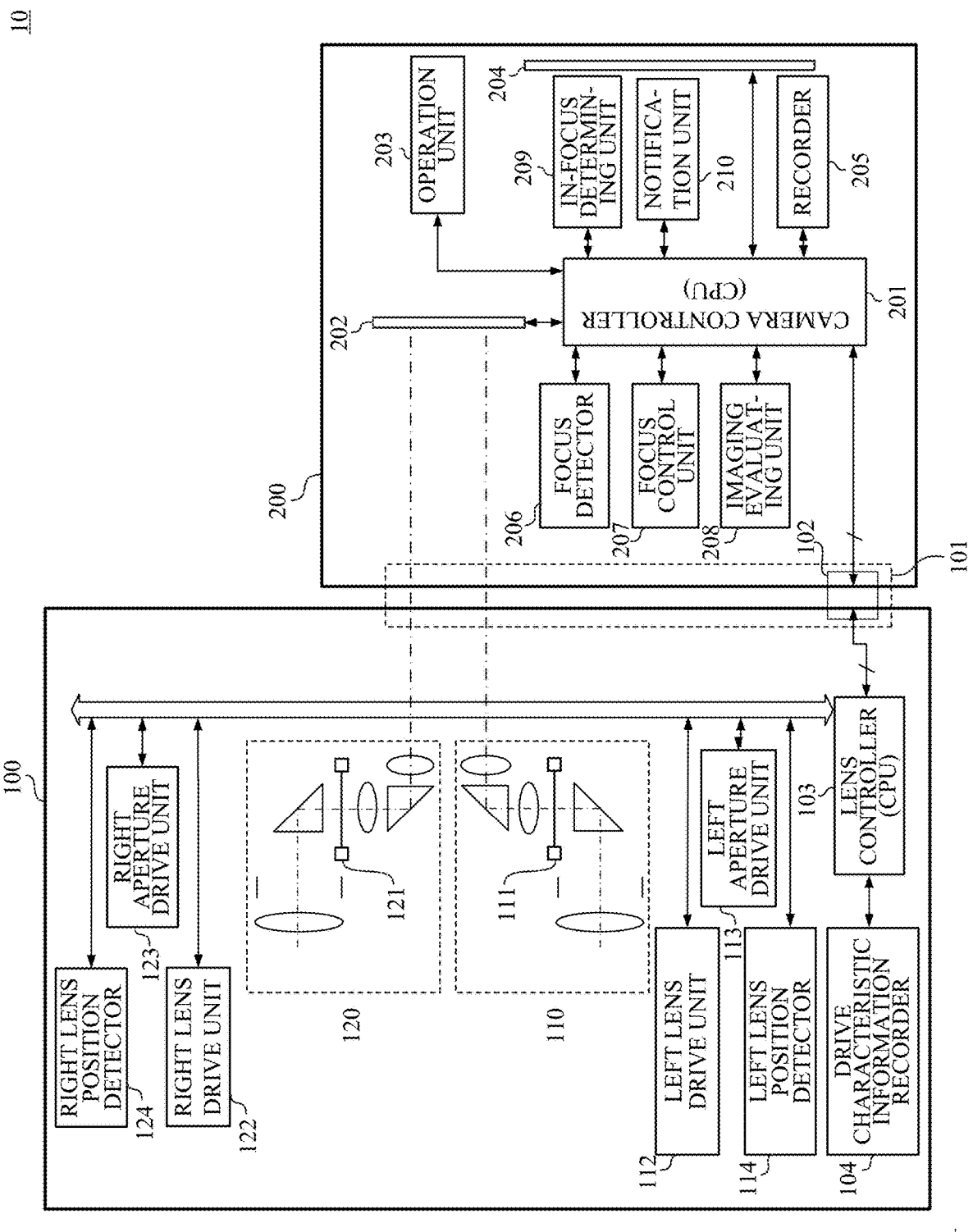
FIG. 1 illustrates the configuration of an imaging system according to each embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

As described below, the image pickup apparatus (imaging system) according to each embodiment has a compound-eye optical system including a first optical system and a second optical system arranged in parallel with the first optical system, and has an imaging unit configured to capture an object image formed by each of the first optical system and the second optical system. The conventional compound-eye optical system is likely to generate an imaging condition difference between the optical systems due to various factors, and may not obtain the same focus detecting result through all the optical systems, each of which performs focus detection for the same object.

For example, as a target object moves away from an intermediate position of each optical system, an object distance difference between the optical systems and parallax are likely to occur. As the object distances are closer, the parallax is likely to occur. In a case where there is parallax, views of the objects to be focus-detected are different, and consequently a difference in the focus detecting result of each optical system occurs. In a case where focus positions are controlled based on the focus detecting results, a difference in the in-focus degree between the optical systems easily occur.

For example, imaging using a fisheye lens with a short focal length is likely to include the outdoor sky or indoor ceiling in an imaging area, and a high-luminance area such as the sun and its reflected light, or indoor illumination in the imaging area. In particular, imaging using a compound-eye optical system for Virtual Reality (VR) imaging is likely to include reflected light only in parts of optical systems, and high-luminance areas in the imaging area. Then, a difference in the focus detecting result occurs between the optical systems, and in a case where the focus positions are controlled based on the focus detecting results, a difference in the in-focus degree between the optical systems is likely to occur.

For example, in a case where there is another object in front of the main object that acts as an occlusion, parallax occur between the images obtained by the optical systems, the occlusion degree of the other object differs in each optical system, and consequently a difference in the focus detecting result between the optical systems occurs. In a case where the focus positions are controlled based on the focus detecting results, the part of the optical systems may be in focus, while the other optical system may be out of focus due to the occlusion, or be in focus on the other object, or cause false in-focus due to perspective conflict between the main object and the other object.

In addition, the influence of the other object acting as an occlusion, the occlusion of the main object by the other object, and the shadow view of the other object may be different between the optical systems, and low luminance areas due to the shadow may occur in the imaging area only in the part of the optical systems. As a result, a difference in focus detecting accuracy between the optical systems may occur, and in a case where the focus positions are controlled based on the focus detecting results, a difference in the in-focus degree of each optical system is likely to occur.

As mentioned above, the part of the optical systems in a compound-eye optical system may perform erroneous focus detection. However, in a case where focus detection is performed in each optical system of the compound-eye optical system, in-focus determination is performed based on the same determination criteria for all optical systems, and in-focus notification (in-focus alert) such as an in-focus sound and an in-focus display on the display is performed, in-focus can be obtained only in imaging under favorable conditions where none of the above problems occur with the object. Then, in a case where the above problem occurs with the object, the part of the optical systems may not reach the in-focus determination, the procedure cannot transition to the imaging operation, or the focus control may continue because no in-focus notification is given.

Each embodiment will be described in detail below.

First Embodiment

Configuration of Imaging System

Referring now to FIG. 1, a description will be given of an imaging system (digital camera system) 10 according to the first embodiment of the present disclosure. FIG. 1 is a configuration diagram of the imaging system 10.

The imaging system 10 includes a lens apparatus 100 having a twin-lens optical system as an example of a compound-eye optical system in which a plurality of different optical systems (imaging optical systems) are provided in a single lens barrel, and a camera body (image pickup apparatus) 200. The lens apparatus 100 is attachable to and detachable from the camera body 200 via a mount unit 101, which is a mechanical lens attachment mechanism. The mount unit 101 has an electrical contact unit 102. The electrical contact unit 102 has terminals for communication bus lines such as a communication clock line, a data communication line, and a data receiving line. Thereby, the lens apparatus 100 and the camera body 200 can communicate with each other. This embodiment is also applicable to an image pickup apparatus in which the camera body and the lens apparatus are integrated.

The lens apparatus 100 has a left optical system (first optical system) 110 and a right optical system (second optical system) 120 arranged in parallel with the left optical system 110. The left optical system 110 and the right optical system 120 form a compound-eye optical system. Each of the left optical system 110 and the right optical system 120 includes a plurality of lenses including a focus lens, and a prism or a reflector that bends incident light. Each of the left optical system 110 and the right optical system 120 has a left aperture stop (first aperture stop) 111 and a right aperture stop (second aperture stop) 121, each of which limits the incident light. In the left optical system 110 and the right optical system 120, optical elements having the same optical characteristics are symmetrically arranged so that their optical axes are parallel to each other with a predetermined base length. The left optical system 110 and the right optical system 120 are entire-circumference fisheye lenses, each having a hemispherical wide field of view of approximately 180 degrees on the front surface.

The lens apparatus 100 includes a left lens drive unit 112 that includes an unillustrated driving system including an ultrasonic motor, a stepping motor, a DC motor, or the like for focus control of the left optical system 110 and controls the driving system. The lens apparatus 100 further includes a right lens drive unit 122 for focus control of the right optical system 120. Focusing of the left optical system 110 is performed by the left lens drive unit 112 and its driving system. Similarly, focusing of the right optical system 120 is performed by the right lens drive unit 122 and its driving system.

The lens apparatus 100 has a left aperture drive unit 113 that controls the aperture of the left aperture stop 111. Similarly, the lens apparatus 100 has a right aperture drive unit 123 that controls the aperture of the right aperture stop 121. In this embodiment, the left optical system 110 and the right optical system 120 function as a plurality of different imaging optical systems.

The lens apparatus 100 has a drive characteristic information recorder 104. The drive characteristic information recorder 104 records various optical design values such as the focus lenses of the left optical system 110 and the right optical system 120, the left aperture stop 111 and the right aperture stop 121, and the like, and has information on an approximately corresponding object distance based on the focal length and the focal position. The drive characteristic information recorder 104 also records focus sensitivity information based on optical characteristics consisting of coefficients or equations including coefficients, which show the correspondence between an image-plane moving amount determined by the defocus amount and an actual drive amount of the focus lens, for each focal position.

The left lens drive unit 112, the left aperture drive unit 113, the right lens drive unit 122, the right aperture drive unit 123, and the drive characteristic information recorder 104 are connected to a lens controller 103 including a CPU that controls the overall operation of the lens apparatus 100.

The lens apparatus 100 includes a left lens position detector 114 that acquires a phase waveform of the drive system included in the left lens drive unit 112 from the left lens drive unit 112 through the lens controller 103 and detects the position information on the left optical system 110. The lens apparatus 100 further includes a right lens position detector 124 that acquires a phase waveform of the drive system included in the right lens drive unit 122 from the right lens drive unit 122 through the lens controller 103 and detects the position information on the right optical system 120.

The camera body 200 includes a camera controller 201 including a CPU that controls the overall operation of the camera body 200. The camera body 200 communicates with the lens apparatus 100 via the electrical contact unit 102, transmits a control request regarding focusing of the left optical system 110 and the right optical system 120, and receives the control result. The camera body 200 also transmits a control request regarding openings of the left aperture stop 111 and the right aperture stop 121, and receives the control result.

The incident light is guided from an optical path through the left optical system 110 and the left aperture stop 111, and an optical path through the right optical system 120 and the right aperture stop 121 to an imaging unit 202, which includes an image sensor, CDS, ADC, and a processor that performs development calculations (not illustrated) in the camera body 200. The imaging unit 202 obtains compound-eye imaging data by photoelectrically converting the incident object images and performing development calculations. That is, the imaging unit 202 captures an object image formed by each of the left optical system 110 and the right optical system 120, and obtains imaging data corresponding to the object image formed by the left optical system 110 and imaging data corresponding to the object image formed by the right optical system 120.

Figure 2:
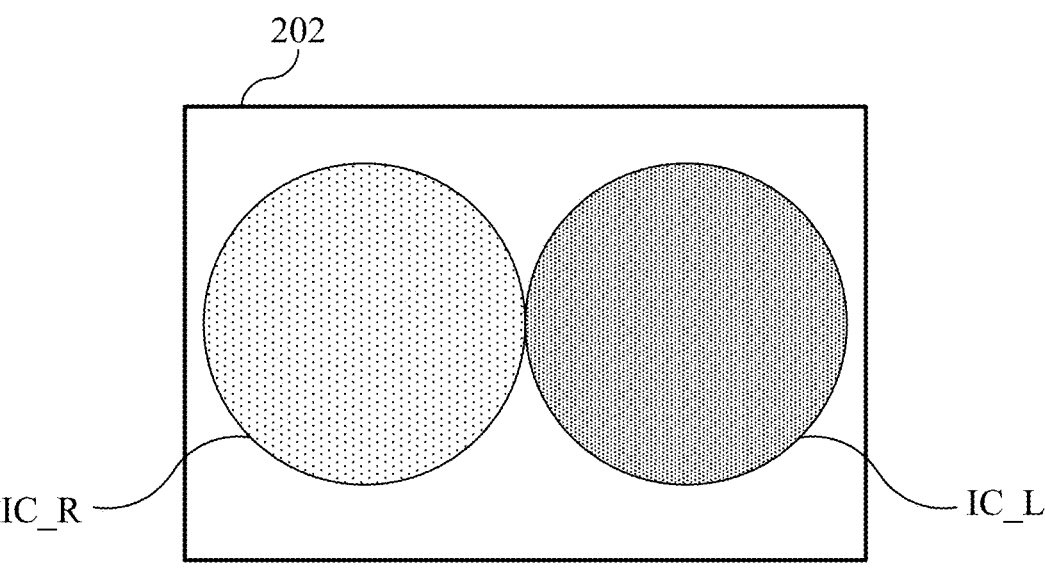
FIG. 2 explains an image circle formed on an imaging surface of an imaging unit in each embodiment.

Referring now to FIG. 2, a description will be given of image circles on the imaging surface of the imaging unit 202. FIG. 2 explains image circles IC_L and IC_R of the effective angle of view formed by the left optical system 110 and the right optical system 120 on the imaging surface of the imaging unit 202 viewed from the object side to the imaging unit 202 side. In this embodiment, each optical system is an entire-circumference fisheye lens having a wide hemispherical field of view of approximately 180 degrees, and a circular image of each optical system is imaged on the imaging surface. As illustrated in FIG. 2, the image circles IC_L and IC_R formed by the left optical system 110 and the right optical system 120 are arranged side by side so as not to overlap each other on the imaging surface of the imaging unit 202. Optical images having parallax are formed side by side by the compound-eye optical system on the imaging surface of the imaging unit 202. This configuration provides the optical images of the compound-eye optical system simultaneously.

In FIG. 1, the camera body 200 includes an operation unit 203 for inputting various operations to the camera body 200, and a display unit 204 for displaying an object image captured by the imaging unit 202 and various operation statuses. The operation unit 203 has a two-stroke type switch and multiple buttons (not illustrated). The first step (SW1) of the two-stroke type switch is a switch for starting an imaging preparation operation such as photometry, focus detection, and focus control using an imaging signal. The second switch (SW2) is a switch for starting an imaging operation such as charge accumulation and charge readout in the imaging unit 202 in order to obtain a still image. When SW2 is pressed all at once, the imaging preparation operations such as photometry and focus detection performed by SW1 are performed, and then a still image is obtained. By continuing to press SW2, imaging preparation operations such as photometry and focus detection performed by SW1 and still image acquisition performed by SW2 are repeated at a predetermined cycle. Thereby, continuous imaging of still images is performed.

The display unit 204 includes a display member such as a liquid crystal panel or an organic EL panel, and a micro-computer and VRAM (not illustrated) for displaying digital display images. The operation unit 203 has a plurality of buttons (not illustrated) for various purposes that accept various operation inputs into the camera body 200, such as an operation input for powering on and off.

In this embodiment, after the power of the camera body 200 is turned on, the imaging unit 202 starts periodic imaging, such as at 60 fps, and the captured object images are developed, calculated, and displayed on the display unit 204. In this embodiment, the display unit 204 has a configuration such that two optical images illustrated in FIG. 2 are displayed on one display unit 204. However, this embodiment is not limited to this example, and another configuration may be used in which an approximately corresponding partial area is cut out from each object image of the compound-eye optical system and displayed on an external head mount display having different display units for the left eye and the right eye. When an operation input is made by pressing SW2 on the operation unit 203, the imaging unit 202 converts the captured still image into a predetermined known data format and records it in a recorder 205.

The imaging unit 202 has an image sensor (not illustrated) having a plurality of pixels each having a photoelectric conversion unit, a CDS (not illustrated) that subtracts noise charges from charges accumulated in the image sensor, and an ADC (A/D converter) (not illustrated) that converts an analog electrical signal (image signal) obtained by sequentially transferring the charges output from the CDS to each pixel into image data as digital data. The image sensor can use, for example, a Charge Coupled Device (CCD) or Complementary Metal-Oxide-Semiconductor (CMOS) image sensor. The CDS and ADC (not illustrated) are not limited to being independent of the image sensor as described above, and may be incorporated into the image sensor. At least part of the pixels of the image sensor has a configuration capable of outputting a pair of pupil-division image signals for focus detection as image data as digital data. The pair of image data is transmitted to a focus detector 206 connected to the camera controller 201.

The focus detector 206 performs a correlation calculation for the pair of image data for focus detection obtained by the imaging unit 202, and calculates a correlation amount for each phase shift amount. The focus detector 206 calculates a defocus amount of the object image by a focus detection calculation of a known phase-difference detecting method, based on the phase shift amount that maximizes the correlation amount and the optical characteristic of the lens apparatus 100. Thus, the focus detector 206 detects the defocus amount of each optical system relating to the object image formed by each of the left optical system 110 and the right optical system 120. The pair of image data for focus detection obtained by the imaging unit 202 will be described in detail later.

The focus control unit 207 controls each focus position of the compound-eye optical system (left optical system 110 and right optical system 120) so that the object images formed by the optical systems in the compound-eye optical system are imaged on the imaging unit 202. More specifically, the focus control unit 207 acquires the current focus position of the focus lens (not illustrated) included in each optical system from the left lens position detector 114 and the right lens position detector 124. The focus control unit 207 also acquires focus sensitivity information for calculating a displacement amount of the focus lens corresponding to the defocus amount according to the focus position from the drive characteristic information recorder 104.

The focus control unit 207 also acquires the defocus amount of each optical system from the focus detector 206 and calculates the target drive amount of the focus lens in each optical system using the focus sensitivity information. The focus control unit 207 issues a focus control command to the left lens drive unit 112 and the right lens drive unit 122 to drive the focus lens by the calculated target drive amount in each optical system to move the focus position of each optical system to the in-focus position.

The imaging evaluating unit 208 evaluates an imaging situation (imaging state) of each object image of the compound-eye optical system. More specifically, the imaging evaluating unit 208 has an in-focus evaluating mode that controls whether to perform in-focus determination for all the object images of the compound-eye optical system or only for a part of them. The imaging evaluating unit 208 selects and sets the in-focus evaluating mode according to the operation input from the operation unit 203. The in-focus evaluating mode includes a "whole in-focus evaluating mode" in which in-focus determination is performed for all optical systems, and a "partial in-focus evaluating mode" in which in-focus determination is substantially performed for only part of the compound-eye optical system. In the initial setting, the whole in-focus evaluating mode is selected in the imaging evaluating unit 208.

The imaging evaluating unit 208 also accepts an evaluation setting for selecting the above various evaluation viewpoints according to the operation input from the operation unit 203 by the user at any time while the camera body 200 is powered on. The imaging evaluating unit 208 also determines an in-focus determination reference value for each optical system according to the selection status of the in-focus determination mode. An in-focus determining threshold as the in-focus determining criterion (reference value) determined by the imaging evaluating unit 208 has a first in-focus determining threshold (first reference value) that is basically selected, and a second in-focus determining threshold (second reference value) that substantially invalidates the focus determination.

The first in-focus determining threshold is a threshold according to a permissible circle of confusion diameter based on the size of the image sensor (not illustrated) of the imaging unit 202 and the F-numbers (aperture values) of the left aperture stop 111 and the right aperture stop 121, and is defined by the following equation (1):

$$T_1 = k_1 \times F \times \delta \qquad (1)$$

where $T_1$ is a first in-focus determining threshold, $k_1$ is an arbitrary coefficient (for example, value of 0.5), F is an F-number (aperture value) of each optical system, and $\delta$ is a diameter of a permissible circle of confusion.

The second in-focus determining threshold is expressed, for example, by the value of ∞ (infinity) or the maximum value that can be set. This embodiment does not limit the in-focus determining threshold to these two types, and may change the number of types. Each in-focus determining threshold is a threshold expressed by an absolute value of a defocus amount. The in-focus determining threshold is compared with the defocus amount detected by the focus detector 206, and it is determined whether or not in-focus is achieved based on whether the target position is included in a range having a center at an in-focus position or a focus control position and a width indicated by the positive and negative values of each in-focus determining threshold.

The in-focus determining unit 209 determines whether the focus position of each optical system is in focus on the object based on the defocus amount of each optical system detected by the focus detector 206 and each in-focus determining threshold of the compound-eye optical system determined by the imaging evaluating unit 208. That is, the in-focus determining unit 209 determines the focus state of each of the left optical system 110 and the right optical system 120. As described later, the in-focus determining unit 209 determines that the left optical system 110 is in focus in a case where the defocus amount of the left optical system 110 is within a first range set using the first reference value (e.g., first in-focus determining threshold). The in-focus determining unit 209 determines that the right optical system 120 is in focus in a case where the defocus amount of the right optical system 120 is within a second range set using the second reference value (e.g., second in-focus determining threshold).

In a case where the in-focus determining unit 209 determines that each optical system is in focus on the object, a notification unit (alert unit) 210 notifies the user of the in-focus state by a predetermined sound or display. The display during in-focus determination is a rectangular frame indicating a focus detecting area superimposed in a predetermined color on the imaging data displayed on the display unit 204. The notification unit 210 may have a built-in speaker (not illustrated), and emits a predetermined short tone in a case where the in-focus determining unit 209 determines that each optical system is in focus on the object.

Configuration of the Imaging Unit 202

Figure 3:
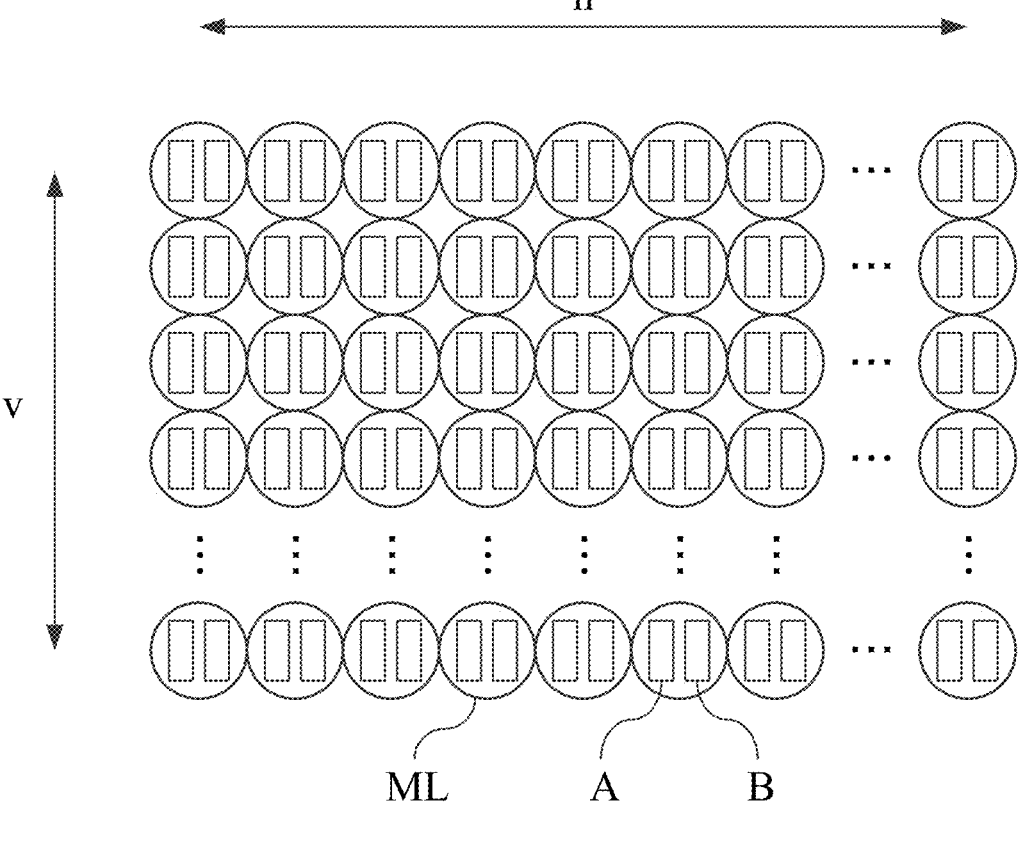
FIG. 3 illustrates the pixel array of the imaging unit in each embodiment.
Figure 4A:
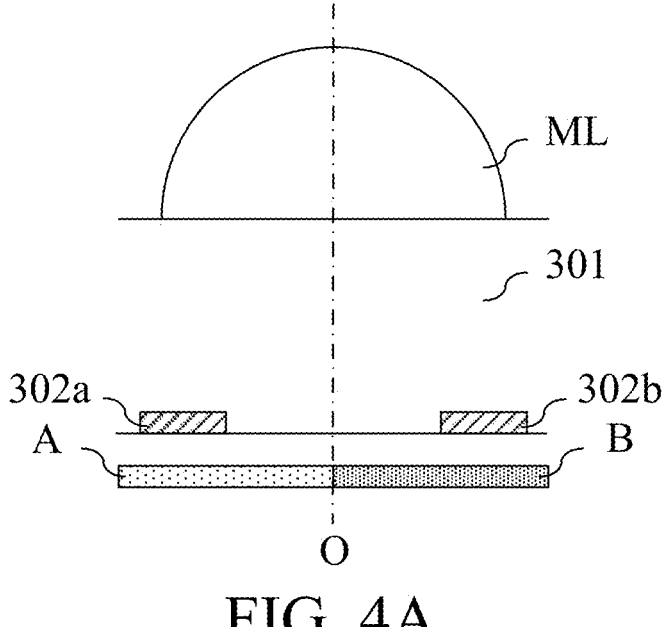
FIGS. 4A and 4B are pixel structure diagrams of the imaging unit in each embodiment.
Figure 4B:
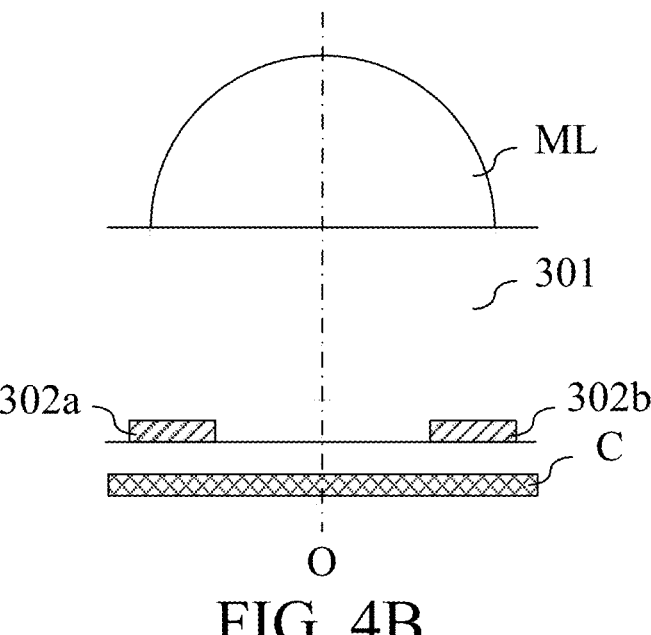

Referring now to FIGS. 3, 4A, and 4B, a description will be given of the configuration of the imaging unit 202. FIG. 3 is a pixel array diagram of the imaging unit 202, and is a schematic diagram of a light receiving surface of the imaging unit 202 viewed from the incident light side. FIG. 4 is a pixel structure diagram of the imaging unit 202.

Each pixel in the imaging unit 202 has a first focus detecting pixel A and a second focus detecting pixel B, which a pair of light rays divided by the exit pupil plane enter. A light beam that passes through a first pupil area of the exit pupil enters the first focus detecting pixel A, and a light beam that passes through a second pupil area of the exit pupil enters the second focus detecting pixel B. A light-collecting microlens ML is disposed in front of the first focus detecting pixel A and the second focus detecting pixel B. Each pixel consists of the first focus detecting pixel A, the second focus detecting pixel B, and the microlens ML. Arranged on the light receiving surface of the image sensor are h pixels in the horizontal direction and v pixels in the vertical direction.

Each charge from the first focus detecting pixel A and the second focus detecting pixel B can be used for a focus detecting image signal. Adding up the charges from the first focus detecting pixel A and the second focus detecting pixel B can provide a charge as an imaging pixel C illustrated in FIG. 4B, which can be used for a captured image signal. Light beams that have passed through the same microlens ML enter the first focus detecting pixel A and the second focus detecting pixel B. Each pixel has a red, green, or blue color filter (not illustrated), which is arranged in the known Beyer array.

The microlens ML is formed on the light incident side of the first focus detecting pixel A and the second focus detecting pixel B. A smooth layer 301 is a flat surface for forming the microlens ML. Light shielding layers 302a and 302b are disposed so as to prevent unnecessary light rays at oblique angles from entering the first focus detecting pixel A and the second focus detecting pixel B.

Due to the configuration illustrated in FIGS. 4A and 4B, the pupil of the imaging optical system is equivalently divided symmetrically between the imaging optical system viewed from the first focus detecting pixel A and the imaging optical system viewed from the second focus detecting pixel B. Since the pupil position of the imaging optical system is different between the view from the first focus detecting pixel A and the view from the second focus detecting pixel B, there is parallax between the light beam received by the first focus detecting pixel A and the light beam received by the second focus detecting pixel B.

Principle of Focus Detection Using Imaging-Surface Phase-Difference Method

In a pair of a row of a plurality of first focus detecting pixels A (first focus detecting pixel row) and a row of a plurality of second focus detecting pixels B (second focus detecting pixel row), two approximated images are formed as the number of pixels in the image sensor increases. In a case where the imaging optical system is in focus on the object, a row of image signals (A image signal) formed by the first focus detecting pixel row and a row of image signals (B image signal) formed by the second focus detecting pixel row match each other. In a case where the imaging optical system is out of focus, a phase difference occurs between the An image signal and the B image signal. The direction of the phase difference is reversed between a front focus state in which the imaging position is closer to the expected focal plane and a rear focus state in which the imaging position is farther from the expected focal plane.

Figure 5:
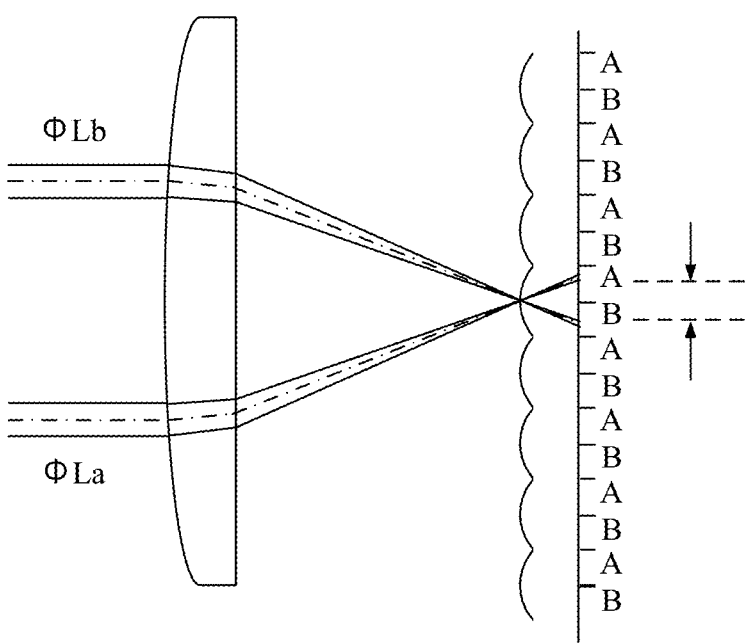
FIG. 5 explains a phase difference between A and B image signals in an in-focus state in each embodiment.
Figure 6:
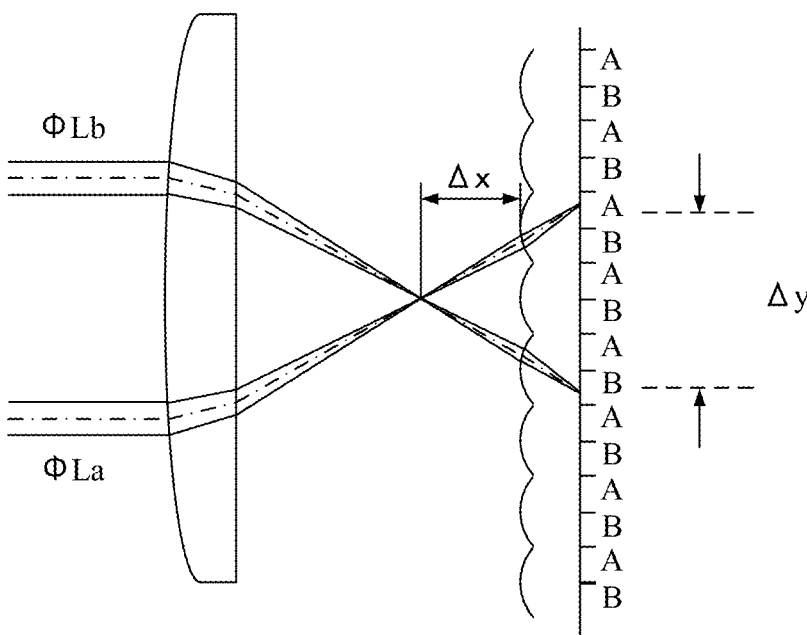
FIG. 6 explains a phase difference between the A and B image signals in a defocus (out-of-focus) state in each embodiment.

FIG. 5 explains the phase difference between the An image signal and the B image signal in an in-focus state at a certain pixel. FIG. 6 explains the phase difference between the An image signal and the B image signal in a defocus state before an in-focus state is obtained at a certain pixel. In FIGS. 5 and 6, the first focus detecting pixel A is conceptually illustrated as A and the second focus detecting pixel B as B. A light beam from a specific point on an object is divided into a light beam $\Phi La$ that passes through a divided pupil corresponding to the first focus detecting pixel A and enters the first focus detecting pixel A, and a light beam $\Phi Lb$ that passes through a divided pupil corresponding to the second focus detecting pixel B and enters the second focus detecting pixel B.

Since these two light beams are incident from the same point on the object, in a case where the imaging optical system is in focus, as illustrated in FIG. 5, they pass through the same microlens and reach one point on the image sensor consisting of the pair of the first focus detecting pixel A and the second focus detecting pixel B. Therefore, the pair of image signals A and B match each other.

On the other hand, as illustrated in FIG. 6, in a focus shift state by $\Delta x$ in the optical axis direction, incident positions of the light beams $\Phi La$ and $\Phi Lb$ shift from each other by the change in the incident angle of the light beams $\Phi La$ and $\Phi Lb$ on the microlens. FIG. 6 illustrates the focus shift state by $\Delta x$ in the optical axis direction, and the incident positions of the light beams $\Phi La$ and $\Phi Lb$ that are shifted by $\Delta y$. Therefore, a phase difference occurs between the pair of image A and B signals. Calculating a correlation amount for each image shift amount for the pair of image A and B signals and a phase difference based on the correlation amount can provide focus detection using the phase difference method.

Operation of Imaging System

Figure 7A:
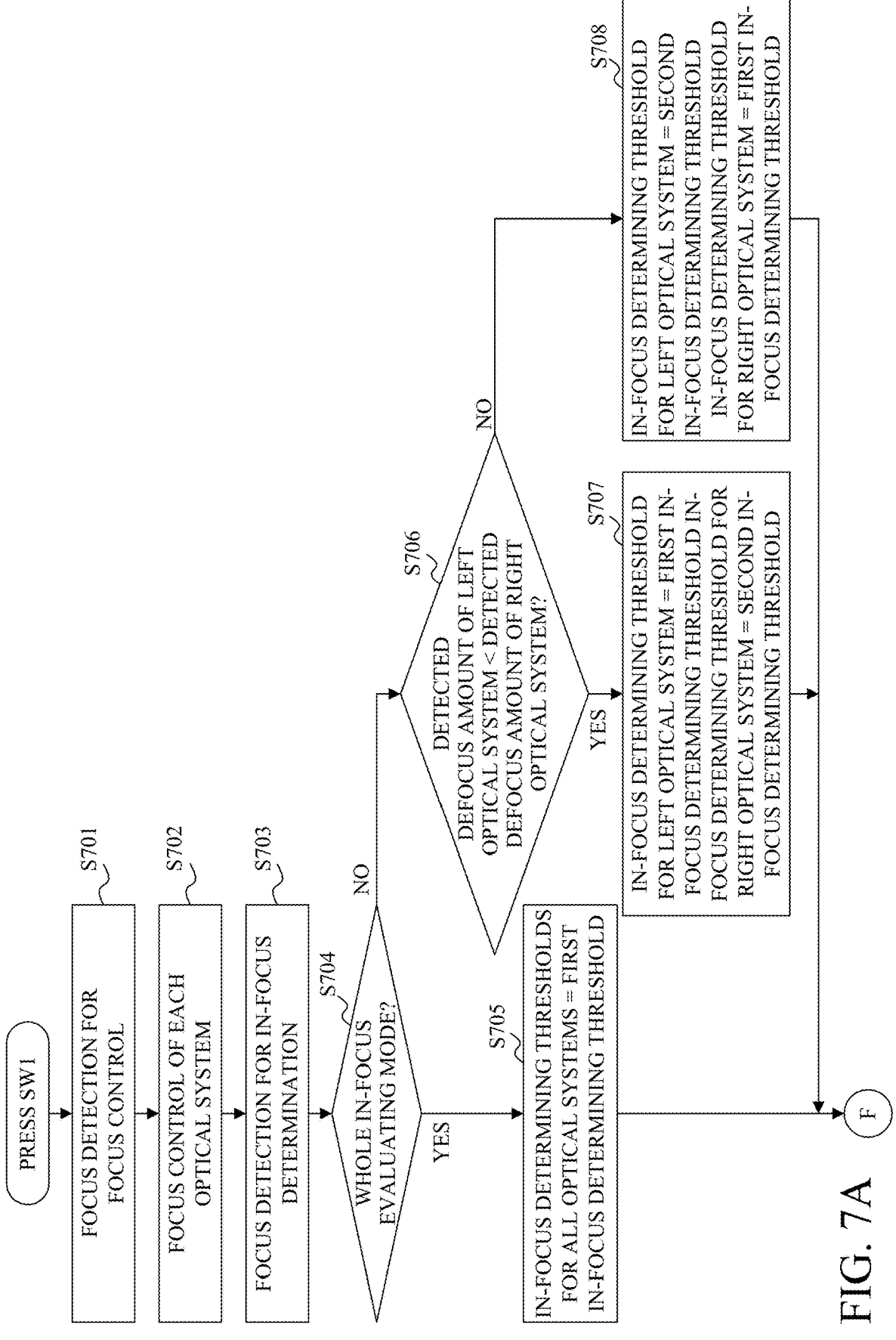
FIGS. 7A and 7B are a flowchart illustrating an operation of determining an in-focus determining criterion according to a first embodiment.
Figure 7B:
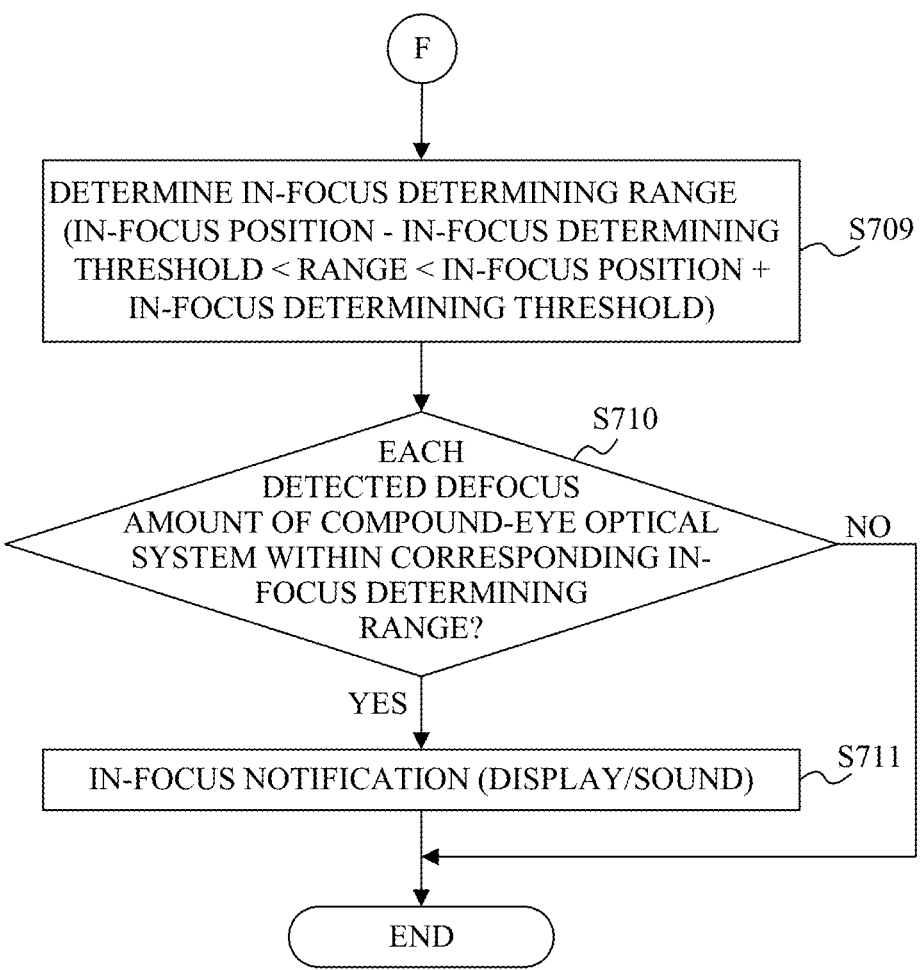

Referring now to FIGS. 7A and 7B, a description will be given of the operation of determining the in-focus determining criterion (reference value) for each object image of the compound-eye optical system (left optical system 110 and right optical system 120) in the imaging system 10 according to this embodiment. FIGS. 7A and 7B are a flowchart illustrating the operation of determining the in-focus determining criterion. This operation is realized by the camera controller 201 controlling each part, and various operations are performed by the camera controller 201 unless the operation source is specified.

After the imaging system 10 according to this embodiment transitions to an acceptable state of various operation inputs through the operation unit 203, the power is turned on and each object image of the compound-eye optical system captured by the imaging unit 202 is displayed on the display unit 204. Then, when SW1 is pressed to request an imaging preparation operation such as a focus detecting operation, this operation starts and the flow proceeds to step S701. When the power is turned on, the camera controller 201 confirms that the lens apparatus 100 is attached to the camera body 200 from the energized state of the electrical contact unit 102 provided on the mount unit 101, and recognizes a state in which focus control and aperture control are available.

First, in step S701, the focus detector 206 detects a defocus amount for a predetermined focus detecting area of each object image of the compound-eye optical system. The focus detecting area is a predetermined area near the center of each object image, or an imaging area specified by a user's operation input through the operation unit 203. The focus detection in this step is performed for each object image of the compound-eye optical system, but is not limited to this example. This step may use a simplified form in which focus detection is performed only for an object image of a part of the optical systems. The focus detector 206 outputs the detected defocus amount of each optical system to the focus control unit 207 and the imaging evaluating unit 208. After the defocus amount is output, the flow proceeds to step S702.

In step S702, the focus control unit 207 issues a focus control command to each of the optical systems based on the defocus amount of each optical system detected by the focus detector 206. More specifically, the focus control unit 207 calculates a target drive amount for each focus lens of the left optical system 110 and the right optical system 120, and issues a focus control command to the left lens drive unit 112 and the right lens drive unit 122. The focus control unit 207 then receives a callback communication of the focus control completion from the left lens drive unit 112 and the right lens drive unit 122 through the left lens drive unit 112 and the right lens drive unit 122. After the focus control unit 207 receives the focus control completion command, the flow proceeds to step S703.

In step S703, the focus detector 206 performs the same defocus amount detecting operation as in step S701 again to check the in-focus degree after the focus control in the previous step. The focus detection in this step is performed for each object image of each optical system. After the detected defocus amount of each optical system is output to the focus control unit 207 and the imaging evaluating unit 208, the flow proceeds to step S704.

In step S704, the camera controller 201 determines whether the in-focus evaluating mode set in the imaging evaluating unit 208 is the whole in-focus evaluating mode of the two modes and performs in-focus determination based on focus detecting results of all optical systems in the compound-eye optical system. In a case where it is determined that the in-focus evaluating mode is the whole in-focus evaluating mode, the flow proceeds to step S705. On the other hand, in a case where it is determined that the in-focus evaluating mode is the partial in-focus evaluating mode, which performs in-focus determination substantially based only on a focus detecting result of a part of the optical systems in the compound-eye optical system, the flow proceeds to step S706.

In step S705, the imaging evaluating unit 208 sets an in-focus determining threshold as an in-focus determining criterion according to the in-focus evaluating mode. This step is for a case where the whole in-focus evaluating mode is set, and the imaging evaluating unit 208 sets all the in-focus determining thresholds of the compound-eye optical system, that is, the in-focus determining threshold of each object image of the left optical system 110 and the right optical system 120, to the first in-focus determining threshold. After the in-focus determining threshold is set, the flow proceeds to step S709.

In step S706, the imaging evaluating unit 208 compares the defocus amounts of the object images in all optical systems in the compound-eye optical system detected by the focus detector 206, and determines the optical system with the smallest defocus amount. That is, in this step, the imaging evaluating unit 208 compares the defocus amounts of the object images in the left optical system 110 and the right optical system 120 to determine which is smaller. In a case where the defocus amount of the object image in the left optical system 110 is smaller, the flow proceeds to step S707. On the other hand, in a case where the defocus amount of the object image in the right optical system 120 is smaller, the flow proceeds to step S708.

Steps S707 and S708 are processing steps in which the imaging evaluating unit 208 sets an in-focus determining threshold as an in-focus determining criterion according to the in-focus evaluating mode in a case where the partial in-focus evaluating mode is set.

In step S707, the imaging evaluating unit 208 sets the in-focus determining threshold so that in-focus determination is performed only for the object image of the left optical system 110 for which the defocus amount is detected to be smaller. More specifically, the imaging evaluating unit 208 sets the in-focus determining threshold for the object image of the left optical system 110 for which the defocus amount is detected to be smaller and the focal position is closer to an in-focus state to a first in-focus determining threshold (first reference value) that is basically selected. In addition, the imaging evaluating unit 208 sets the in-focus determining threshold for the object image of the right optical system 120, which is not closer to an in-focus state than the left optical system 110, to a second in-focus determining threshold (second reference value) that substantially invalidates (prohibits) the in-focus determination. The second in-focus determining threshold is, for example, a value of ∞ or a maximum value that can be set. By setting the in-focus determining threshold in this manner, a difference in the in-focus degree occurs in each optical system due to various parallaxes, if any, can be permitted by user's manual setting. After the in-focus determining threshold is set, the flow proceeds to step S709.

In step S708, the imaging evaluating unit 208 sets the in-focus determining threshold so that in-focus determination is performed only for the object image of the right optical system 120 for which the defocus amount is detected to be smaller. More specifically, the imaging evaluating unit 208 sets the in-focus determining threshold for the object image of the right optical system 120 for which the defocus amount is detected to be smaller and the focal position is closer to an in-focus state to the first in-focus determining threshold. In addition, the imaging evaluating unit 208 sets the in-focus determining threshold for the object image of the left optical system 110, which is not closer to an in-focus state than the right optical system 120, to the second in-focus determining threshold that substantially invalidates the in-focus determination. By setting the in-focus determining threshold in this manner, a difference in the in-focus degree in each optical system due to various parallaxes, if any, can be permitted by the user's manual setting, similarly to step S707. After the in-focus determining threshold is set, the flow proceed to step S709.

In step S709, the in-focus determining unit 209 determines an in-focus determining range (first range or second range) based on each in-focus determining threshold (first reference value or second reference value) as an in-focus determining criterion for each optical system in the compound-eye optical system. More specifically, the in-focus determining unit 209 determines an in-focus determining range having a range width expressed by the positive and negative values of the in-focus determining threshold and a range center at the in-focus position based on the focus detecting result of the focus detector 206. After the in-focus determining range is determined, the flow proceeds to step S710.

In step S710, the in-focus determining unit 209 determines whether the in-focus position of each optical system after the focus control detected in step S703 is within the in-focus determining range determined in step S709. In a case where the defocus amount of each of all optical systems to be focus-detected, that is, both the left optical system 110 and the right optical system 120, is within the in-focus determining range, the flow proceeds to step S711. On the other hand, in a case where at least one of the defocus amounts is not within the in-focus determining range, the flow ends. In step S711, the notification unit 210 notifies the user of the in-focus state by a predetermined sound or display, and the flow ends.

By performing the operation of determining the in-focus determining criterion according to this embodiment, even if there is a difference in the in-focus degree of each object image of the compound-eye optical system due to the influence of parallax, the user can set an in-focus notification according to the user's intention by changing the setting of the in-focus evaluating mode. In addition, since the in-focus notification is performed according to the user's intention, it becomes easier for the user to perform an imaging operation by operating SW2.

Variation

In this embodiment, in a case where the partial in-focus evaluating mode is set in steps S707 and S708, a second in-focus determining threshold that substantially invalidates the in-focus determination is set as the in-focus determining threshold for the optical system with a larger detected defocus amount. This setting operation can be performed so that the optical system with the larger detected defocus amount does not affect the in-focus notification. However, this embodiment is not limited to this example, and a different operation form may be adopted as long as it is a processing operation that prevents the optical system with the larger detected defocus amount from affecting the in-focus notification.

Second Embodiment

A description will now be given of a second embodiment of the present disclosure. The first embodiment sets the in-focus determining range based on each in-focus determining threshold of the compound-eye optical system using the focus position based on the focus detecting result of the focus detector 206 as the center of the range, and performs in-focus determination. On the other hand, this embodiment sets the in-focus determining range of the other optical system with a range width based on each in-focus determining threshold of the compound-eye optical system using the focus position after focus control of the optical system with the best in-focus degree after focus control as the center of the range. By setting the in-focus determining range in this manner, an in-focus state can be determined in a case where the focus positions after focus control of each optical system are close to each other and the focus position is slightly out of the in-focus determining range in which the in-focus position based on the focus detecting result is set as the center of the range. This in-focus determination can provide a unified in-focus determination in a case where the focus positions after focus control of each optical system are close to each other.

The basic configuration of the imaging system according to this embodiment is the same as that of the imaging system 10 according to the first embodiment described with reference to FIG. 1. However, the operation of the imaging evaluating unit 208 includes a function described later in addition to that of the first embodiment.

Figure 8A:
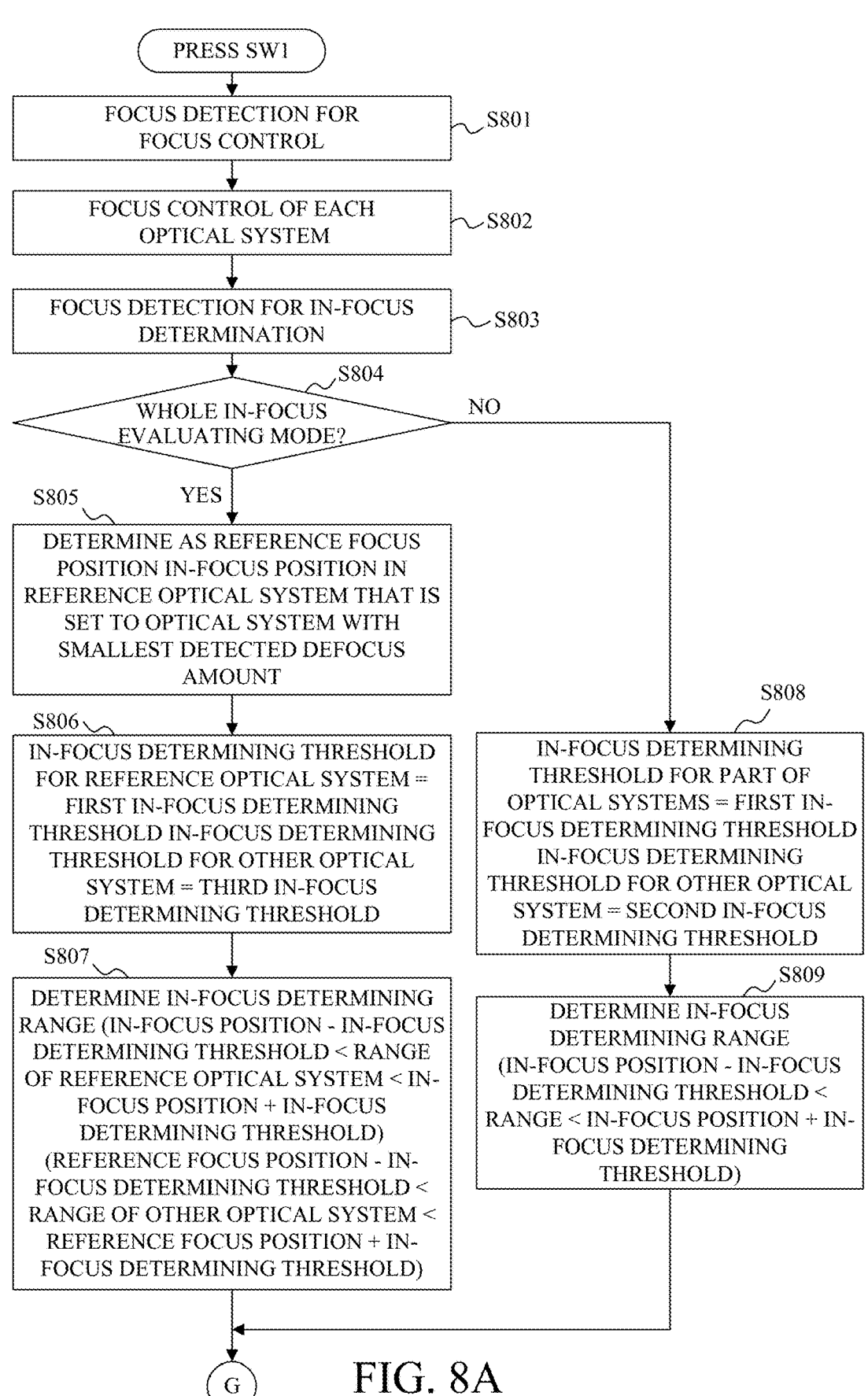
FIGS. 8A and 8B are a flowchart illustrating an operation of determining an in-focus determining criterion according to a second embodiment.
Figure 8B:
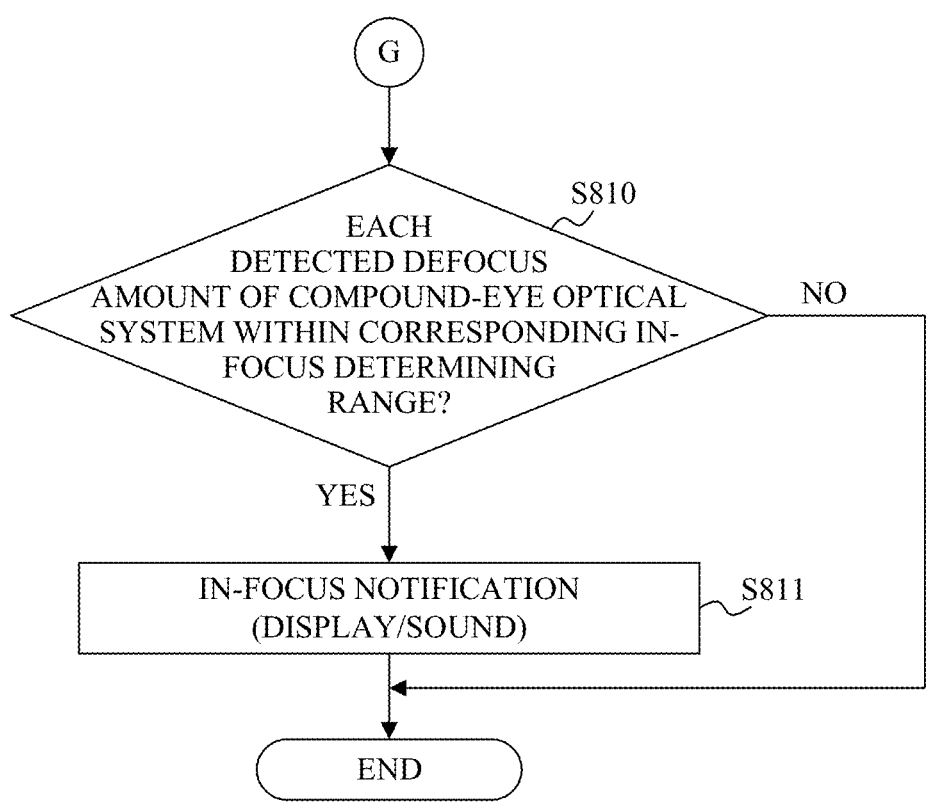
Figure 9A:
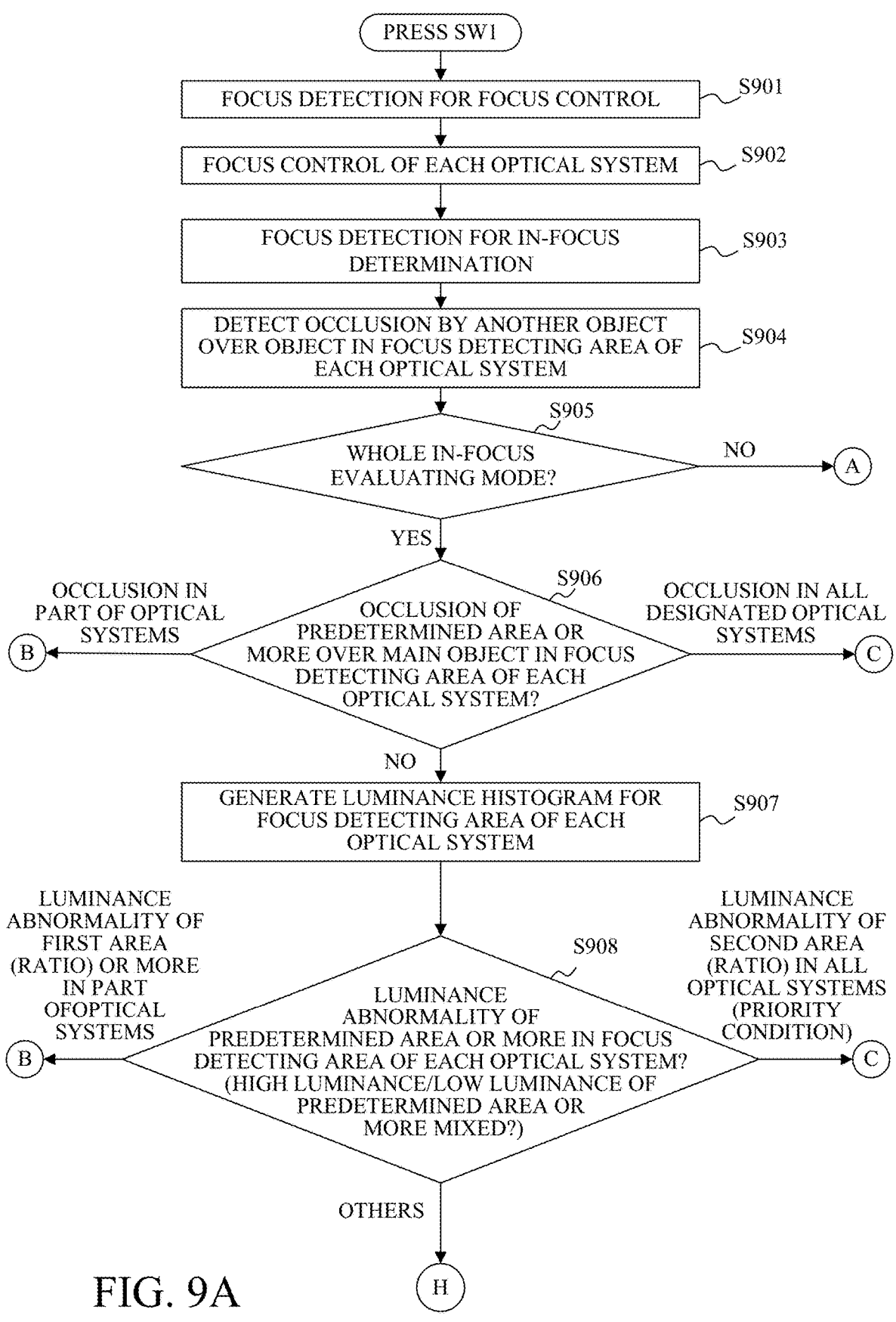
FIGS. 9A to 9E are a flowchart illustrating an operation of determining an in-focus determining criterion according to a third embodiment.
Figure 9B:
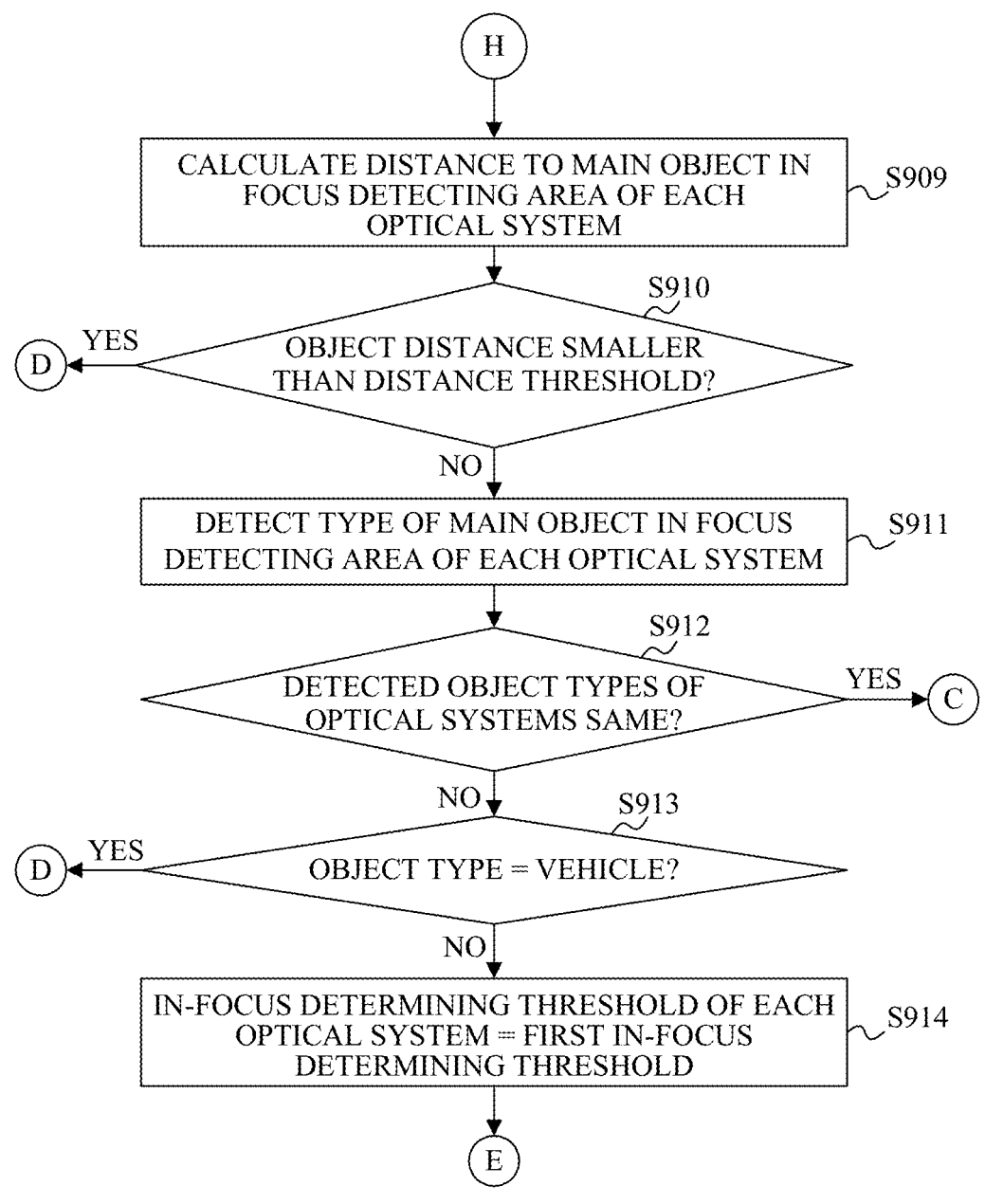
Figure 9C:
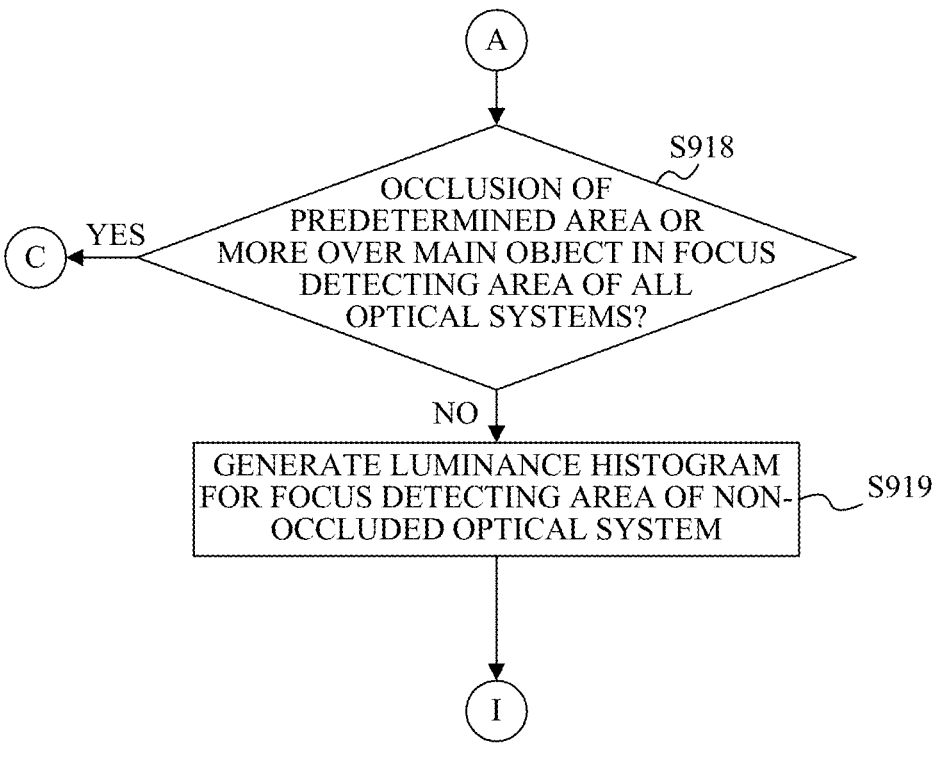
Figure 9D:
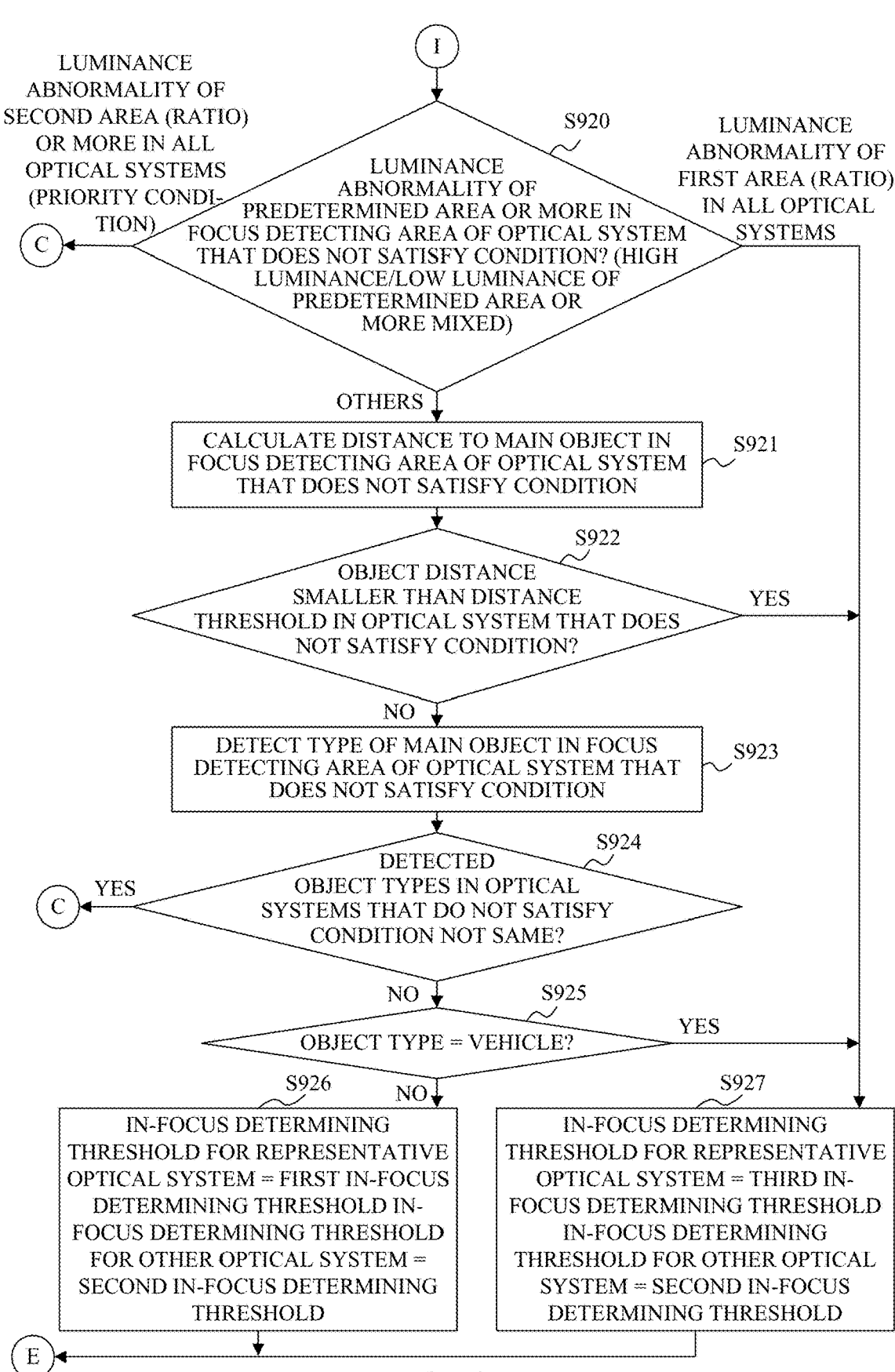
Figure 9E:
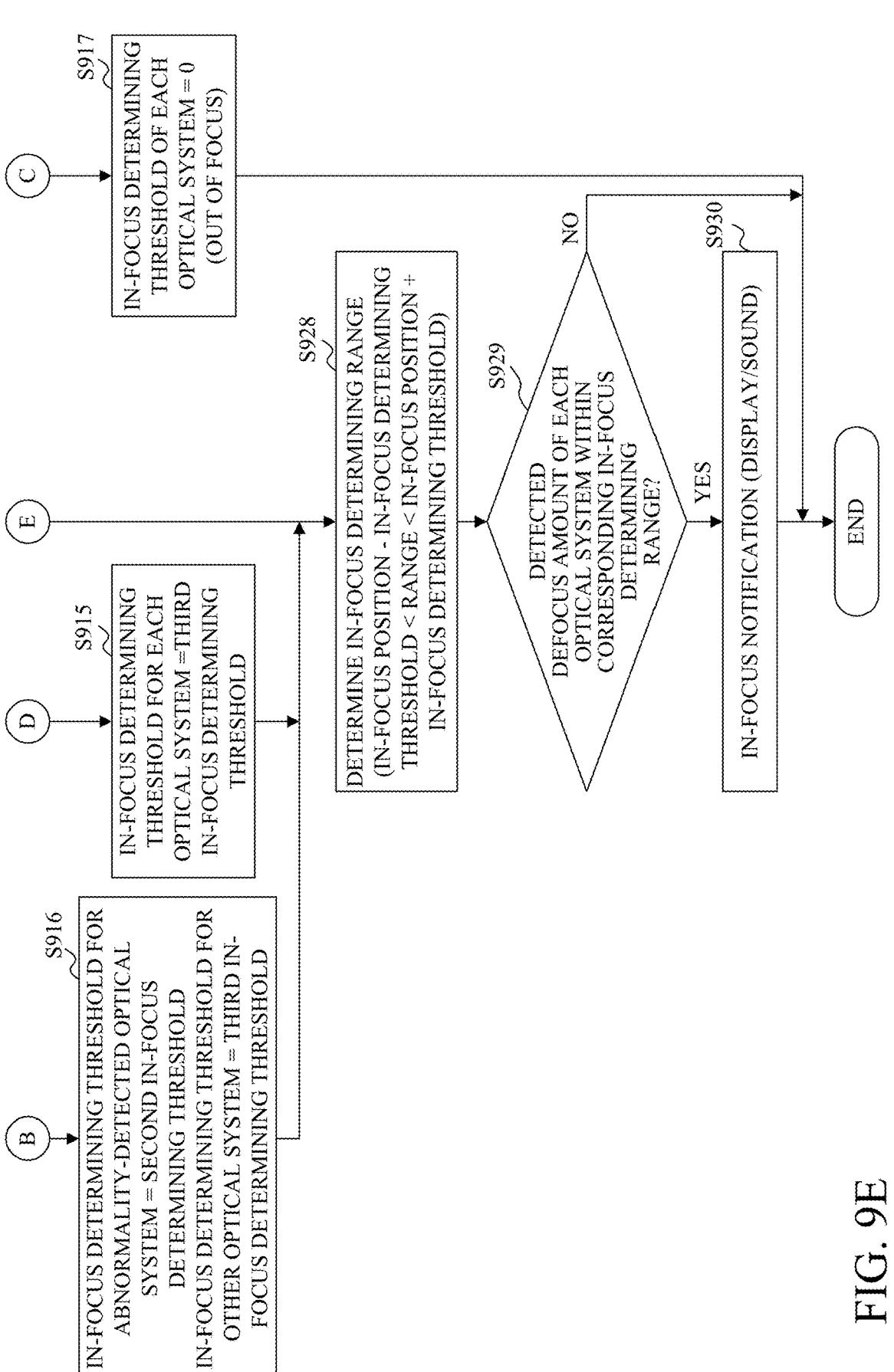

In this embodiment, the imaging evaluating unit 208 stores a third in-focus determining threshold, which has a large value based on a criterion laxer (more lenient) than that of the first in-focus determining threshold, in addition to the first and second in-focus determining thresholds described in the imaging evaluating unit 208 of the first embodiment. Similarly to the first in-focus determining threshold, the third in-focus determining threshold is a threshold according to the permissible circle of confusion diameter based on the size of the image sensor (not illustrated) of the imaging unit 202 and the F-number (aperture value) of the left aperture stop 111 or the right aperture stop 121, and is defined by the following equation (2):

$$T_3 = k_3 \times F \times \delta \qquad (2)$$

where $T_3$ is a third in-focus determining threshold, $k_3$ is an arbitrary coefficient larger than $k_1$ (for example, value of 1.0), F is an F-number (aperture value) of each optical system, and $\delta$ is a permissible circle of confusion.
Operation of Imaging System Referring now to FIGS. 8A and 8B, a description will be given of the operation of determining the in-focus determining criterion for each object image of the compound-eye optical system in the imaging system 10 according to this embodiment. FIGS. 8A and 8B are a flowchart illustrating the operation of determining the in-focus determining criterion according to this embodiment. This operation is realized by the camera controller 201 controlling each unit, and various operations are performed by the camera controller 201 unless the operation source is specified.

After the imaging system 10 according to this embodiment transitions to an acceptable state of various operation inputs through the operation unit 203, the power is turned on and each object image captured by the imaging unit 202 is displayed on the display unit 204. Then, when SW1 is pressed to request an imaging preparation operation such as a focus detecting operation, this operation starts and the flow proceeds to step S801. When the power is turned on, the camera controller 201 confirms that the lens apparatus 100 is attached to the camera body 200, and recognizes a state in which focus control and aperture control are available.

First, in step S801, the focus detector 206 detects a defocus amount for a predetermined focus detecting area of each object image of the compound-eye optical system. The focus detecting area is a predetermined area near the center of each object image, or an imaging area specified by a user's operation input through the operation unit 203. The focus detector 206 outputs the detected defocus amount of each optical system to the focus control unit 207 and the imaging evaluating unit 208. After the defocus amount is output, the flow proceeds to step S802.

In step S802, the focus control unit 207 issues a focus control command to each of the optical systems based on the detected defocus amount of each optical system. More specifically, the focus control unit 207 calculates a target drive amount for each focus lens of the left optical system 110 and the right optical system 120, and issues a focus control command to the left lens drive unit 112 and the right lens drive unit 122. The focus control unit 207 then receives a callback communication of the focus control completion from the left lens drive unit 112 and the right lens drive unit 122 through the left lens drive unit 112 and the right lens drive unit 122. After the focus control unit 207 receives the focus control completion command, the flow proceeds to step S803.

In step S803, the focus detector 206 performs the same defocus amount detection operation as in step S801 to check the in-focus degree after the focus control in the previous step. The focus detection in this step is performed for each object image of each optical system. After the detected defocus amount of each optical system is output to the focus control unit 207 and the imaging evaluating unit 208, the flow proceeds to step S804.

In step S804, the camera controller 201 determines whether the in-focus evaluating mode set in the imaging evaluating unit 208 is the whole in-focus evaluating mode of the two modes and performs in-focus determination based on focus detecting results of all optical systems in the compound-eye optical system. In a case where it is determined that it is the whole in-focus evaluating mode, the flow proceeds to step S805. On the other hand, in a case where it is determined that the in-focus evaluating mode is the partial in-focus evaluating mode, which performs in-focus determination substantially based only on a focus detecting result of a part of the optical systems in the compound-eye optical system, the flow proceeds to step S808.

In step S805, the imaging evaluating unit 208 sets an optical system with the smallest detected defocus amount as a reference optical system, and determines an in-focus position of the reference optical system as a reference focal position. After the reference focal position is determined, the flow proceeds to step S806.

In step S806, the imaging evaluating unit 208 sets an in-focus determining threshold as an in-focus determining criterion according to the in-focus evaluating mode. This step is for a case where the whole in-focus evaluating mode is set, and the imaging evaluating unit 208 sets different in-focus determining thresholds to the reference optical system determined in step S805 and the other optical system. More specifically, the imaging evaluating unit 208 sets the in-focus determining threshold for the reference optical system to the first in-focus determining threshold. In addition, the imaging evaluating unit 208 sets the in-focus determining threshold for the other optical system in the compound-eye optical system excluding the reference optical system to the third in-focus determining threshold which has a large value based on a criterion laxer than that of the first in-focus determining threshold. After the in-focus determining threshold is set, the flow proceeds to step S807.

In step S807, the in-focus determining unit 209 determines an in-focus determining range based on the in-focus determining threshold of the object image of each optical system set by the imaging evaluating unit 208. More specifically, the in-focus determining unit 209 determines the in-focus determining range of the reference optical system with the smallest detected defocus amount as an in-focus determining range having a range width expressed by the positive and negative values of the in-focus determining threshold for the reference optical system and a range center at the in-focus position based on the focus detecting result of the focus detector 206. In addition, the in-focus determining unit 209 determines the in-focus determining range of the other optical system excluding the reference optical system as a range having a range width expressed by the positive and negative values of the in-focus determining threshold of the other optical system and a range center at the focus position in the reference optical system as the control result of the focus control unit 207. After the width of the range is determined, the flow proceeds to step S810.

In step S808, the imaging evaluating unit 208 sets an in-focus determining threshold as an in-focus determining criterion according to the in-focus evaluating mode. This step is for a case where the partial in-focus evaluating mode is set, and the imaging evaluating unit 208 sets the in-focus determining threshold for a part of the compound-eye optical system, that is, the in-focus determining threshold of each object image of either the left optical system 110 or the right optical system 120, to the first in-focus determining threshold. The imaging evaluating unit 208 also sets the in-focus determining threshold for the other optical system to the second in-focus determining threshold that substantially invalidates the in-focus determination. After the in-focus determining threshold is set, the flow proceeds to step S809.

In step S809, the in-focus determining unit 209 determines an in-focus determining range based on the in-focus determining threshold of the object image of each optical system set by the imaging evaluating unit 208. More specifically, the in-focus determining unit 209 determines the in-focus determining range having a range width expressed by the positive and negative values of the in-focus determining threshold and a range center at the in-focus position based on the focus detecting result of the focus detector 206. After the in-focus determining range is determined, the flow proceeds to step S810.

In step S810, the in-focus determining unit 209 determines whether or not the defocus amount of the object image detected in a predetermined focus detecting area of the compound-eye optical system is within the in-focus determining range of each optical system, based on the in-focus determining range determined by the in-focus determining unit 209. In a case where all of the defocus amounts are within the in-focus determining range, the flow proceeds to step S811. On the other hand, in a case where at least one of the defocus amounts is not within the in-focus determining range, the flow ends. In step S811, the notification unit 210 notifies the user of the in-focus state by a predetermined sound or display, and the flow ends.

The operation of determining the in-focus determining criterion according to this embodiment can determine an in-focus state in a case where the focus positions after focus control of each optical system are close to each other and the focus position after focus control is slightly out of the in-focus determining range in which the in-focus position is set as the center of the range. After the in-focus state is determined, the procedure can easily transition to an in-focus notification or the subsequent imaging operation.
Variation In this embodiment, in step S805, the imaging evaluating unit 208 determines the in-focus position in the reference optical system as the reference focus position by setting the optical system with the smallest detected defocus amount as the reference optical system, but the present disclosure is not limited to this example. When SW2 is continuously pressed and the defocus amount detecting operation for checking the in-focus degree after focus control is performed a plurality of times within a predetermined time or equal to or more than a predetermined number of times, the imaging evaluating unit 208 may perform a different determination.

More specifically, the imaging evaluating unit 208 calculates a predicted in-focus position using a known approximation calculation such as the least squares method based on not only the most recent defocus amount detecting result but also the continuous history of a plurality of defocus amount detecting results obtained individually for each optical system. Then, the imaging evaluating unit 208 may determine the in-focus position in the reference optical system as the reference focus position by setting as the reference optical system the optical system with the detected defocus amount that has the smallest difference from the calculated predicted in-focus position. This operation can more accurately provide in-focus determination in a case where focus detection and imaging are continuously repeated for an object moving in a focus displacement direction.

Third Embodiment

A description will now be given of a third embodiment of the present disclosure. In each of the above embodiments, the in-focus determination is performed based on a focus detecting result (imaging state) of each object image, regardless of an imaging state of each object image of the compound-eye optical system. On the other hand, this embodiment adaptively determines the in-focus determining criterion according to the imaging state (imaging state) such as the luminance of each object image of the compound-eye optical system, an object type, an object distance, or the presence or absence of occlusion by another object, based on the influence of parallax of the compound-eye optical system. Even if focus detection is hindered due to the influence of parallax in a part of the optical systems in the compound-eye optical system, this operation can properly perform the in-focus determination.

The basic configuration of the imaging system according to this embodiment is the same as that of the imaging system 10 according to the first embodiment described with reference to FIG. 1. However, the operation of the imaging evaluating unit 208 includes an operation function described later in addition to that of the first embodiment.

More specifically, in order to evaluate the imaging state of each object image of the compound-eye optical system, the imaging evaluating unit 208 evaluates whether a region of each object image of the compound-eye optical system that is equal to or larger than a predetermined area or a predetermined area ratio is occluded by another object. Alternatively, the imaging evaluating unit 208 evaluates, based on each object image, whether each object image of the compound-eye optical system includes a high luminance region equal to or higher than a predetermined level or a low luminance region equal to or lower than a predetermined level by a predetermined area of or more. Alternatively, the imaging evaluating unit 208 evaluates whether the object in the focus detecting area to be focus-detected is a person's face or pupil, or a vehicle such as a train, four-wheeled vehicle, or two-wheeled vehicle, from a feature amount of the object image using a known object recognizing method.

Alternatively, the imaging evaluating unit 208 acquires roughly corresponding information on each object distance based on the focal position of each object image of the compound-eye optical system from the drive characteristic information recorder 104. Then, the imaging evaluating unit 208 evaluates whether the object distance is smaller than a predetermined object distance threshold and the parallax between the optical images of the compound-eye optical system is greater than a predetermined value. The parallax of each optical image of the compound-eye optical system is affected by the base length between the optical systems in the compound-eye optical system and the object distance. The imaging evaluating unit 208 determines the in-focus determining criterion of each optical system according to at least one of the evaluation results of the evaluation viewpoints described above. The imaging evaluating unit 208 according to this embodiment has the third in-focus determining threshold described using equation (2) in the imaging evaluating unit 208 according to the second embodiment.

Operation of Imaging System

Referring now to FIGS. 9A to 9E, a description will now be given of the operation of determining the in-focus determining criterion for each object image of the compound-eye optical system in the imaging system 10 according to this embodiment. FIGS. 9A to 9E are a flowchart illustrating the operation of determining the in-focus determining criterion. This operation is realized by the camera controller 201 controlling each component, and each operation is performed by the camera controller 201 unless the operation source is specified.

After the imaging system 10 according to this embodiment transitions to an acceptable state of various operation inputs through the operation unit 203, the power is turned on, the imaging unit 202 captures an image, and the object image is displayed on the display unit 204. Then, when SW1 is pressed to request an imaging preparation operation such as a focus detecting operation, this operation starts and the flow proceeds to step S901. When the power is turned on, the camera controller 201 confirms that the lens apparatus 100 is attached to the camera body 200 based on the energized state of the electrical contact unit 102 provided on the mount unit 101, and recognizes a state in which focus control and aperture control are available.

First, in step S901, the focus detector 206 detects a defocus amount for a predetermined focus detecting area of each object image of the compound-eye optical system. The focus detecting area is a predetermined area near the center of each object image, or an imaging area specified by a user's operation input through the operation unit 203. The focus detection in this step is performed for each object image of the compound-eye optical system, but is not limited to this example. This step may use a simplified form in which focus detection is performed only for an object image of a part of the optical systems. The focus detector 206 outputs the detected defocus amount of each optical system to the focus control unit 207 and the imaging evaluating unit 208. After the defocus amount is output, the flow proceeds to step S902.

In step S902, the focus control unit 207 issues a focus control command to each of the optical systems in the compound-eye optical system based on the detected defocus amount of each optical system. More specifically, the focus control unit 207 calculates a target drive amount for each focus lens of the left optical system 110 and the right optical system 120, and issues a focus control command to the left lens drive unit 112 and the right lens drive unit 122. The focus control unit 207 then receives a callback communication of the focus control completion from the left lens drive unit 112 and the right lens drive unit 122 through the left lens drive unit 112 and the right lens drive unit 122. After the focus control unit 207 receives the focus control completion command, the flow proceeds to step S903.

In step S903, the focus detector 206 performs the same defocus amount detection operation as in step S901 again to check the in-focus degree after the focus control in the previous step. The focus detection in this step is performed for each object of each optical system. After the detected defocus amount of each optical system is output to the focus control unit 207 and the imaging evaluating unit 208, the flow proceeds to step S904.

In step S904, the imaging evaluating unit 208 determines an image area of a representative main object in each focus detecting area of each optical system in the compound-eye optical system by a known object recognition method based on feature points of color and luminance. The imaging evaluating unit 208 also evaluates whether the main object of each optical system in the compound-eye optical system is occluded by another object in an image area having a predetermined area or more or a predetermined area ratio or more to the focus detecting area. An example of the predetermined area ratio is a value of 30% or 40% of the area of the focus detecting area expressed in pixel units. After the evaluation, the flow proceeds to step S905.

In step S905, the camera controller 201 determines whether the in-focus evaluating mode set in the imaging evaluating unit 208 is the whole in-focus evaluating mode of the two modes, which performs in-focus determination based on the focus detecting results of all optical systems in the compound-eye optical system. In a case where it is determined that the whole in-focus evaluating mode is selected, the flow proceeds to step S906. On the other hand, in a case where it is determined that the in-focus evaluating mode is the partial in-focus evaluating mode which performs in-focus determination substantially based only on a focus detecting result of a part of the optical systems in the compound-eye optical system, the flow proceeds to step S918.

In step S906, in a case where the imaging evaluating unit 208 determines that the occluding condition by the other object in step S905 is satisfied in all optical systems to be focus-detected, the flow proceeds to step S917. In a case where the imaging evaluating unit 208 determines that the occluding condition by the other object is satisfied in only a part of the optical systems to be focus-detected, the flow proceeds to step S916. In a case where there is no other object occluding the main object, the flow proceeds to step S907.

In step S907, the imaging evaluating unit 208 generates a pixel-by-pixel luminance histogram for each focus detecting area of the compound-eye optical system for each optical system. In the luminance histogram, the count is divided at a border between a predetermined high luminance and a predetermined low luminance for determining at least a luminance abnormality. The count may be divided into finer luminance gradations. An example of the predetermined high luminance is a value such as 230 or 240 in a case where the luminance of the digital imaging data is expressed in 8-bit depth from 0 to 255. An example of the predetermined low luminance is a value such as 20 or 10, while the minimum luminance value based on the dark current of the image sensor is a value of 0 in a case where the luminance of the digital imaging data is expressed in 8-bit depth from 0 to 255. After the luminance histogram is generated for each optical system, the flow proceeds to step S908.

In step S908, in each focus detecting area of the compound-eye optical system, it is evaluated whether a high luminance area equal to or higher than a predetermined high luminance level or a low luminance area equal to or lower than a predetermined low luminance level is included by a predetermined area or more or a predetermined area ratio or more to the focus detecting area in pixel units for each optical system. This evaluation is performed by the imaging evaluating unit 208. Each of the predetermined area ratio and the predetermined area has two types of thresholds, a first area ratio threshold or first area threshold, and a second area ratio threshold or second area threshold, which will be described later and are stored in the imaging evaluating unit 208. An example of the predetermined area ratio or the predetermined area is a first area ratio threshold that has an intermediate value such as 30% or 40% of the area of the focus detecting area expressed in pixel units, or a first area threshold that has the same area as this threshold, or a second area ratio threshold is an almost extreme value larger than the first area ratio threshold, such as almost 100%, or a second area threshold that has the same area as this threshold. In a case where the imaging evaluating unit 208 determines that the second area threshold or more is satisfied or the second area ratio or more is satisfied in all optical systems to be focus-detected in the compound-eye optical system, the flow proceeds to step S917. In a case where the imaging evaluating unit 208 determines that the first area threshold or more and less than the second area threshold, or the first area ratio or more and less than the second area ratio is satisfied in a part of the focus detecting area of the optical system to be focus-detected, excluding the condition for proceeding to step S917, the flow proceeds to step S916. In other cases, the flow proceeds to step S909.

In step S909, the imaging evaluating unit 208 acquires information on each roughly corresponding object distance based on the focus position of each object image of the compound-eye optical system from the drive characteristic information recorder 104. After the information is acquired, the flow proceeds to step S910.

In step S910, the imaging evaluating unit 208 evaluates whether the acquired object distance is smaller than a predetermined object distance threshold and whether the distance condition is such that the parallax between the optical images of the compound-eye optical system is greater than a predetermined value. The parallax between the optical images of the compound-eye optical system is affected by the base length between the optical systems in the compound-eye optical system and the object distance. In a case where the shortest one of the obtained object distances of the optical systems is smaller than the predetermined object distance threshold, the flow proceeds to step S915. Otherwise, the flow proceeds to step S911.

In step S911, the imaging evaluating unit 208 determines a predetermined object type using a known object recognition method from the feature values of color and luminance in each object image of the compound-eye optical system. More specifically, the imaging evaluating unit 208 determines whether the object to be focus-detected is a person's face or pupil, or a vehicle such as a train, a four-wheeled vehicle, or a two-wheeled vehicle. After the object type of each optical system is determined, the flow proceeds to step S912.

In step S912, the imaging evaluating unit 208 determines whether the object types of the determined object images of the optical systems are the same. In a case where the object types are not the same, different object images are detected for the optical systems due to parallax, etc., and focus control for the same object is not unified for the compound-eye optical system. In a case where the object types of the optical systems determined by the imaging evaluating unit 208 are not the same, the flow proceeds to step S917. On the other hand, in a case where the object types of the optical systems determined by the imaging evaluating unit 208 are the same, the flow proceeds to step S913.

In step S913, it is determined whether the object type of the object image of each optical system determined by the imaging evaluating unit 208 is a vehicle such as a train, four-wheeled vehicle, or two-wheeled vehicle. In a case where the object type is a vehicle, the flow proceeds to step S915. In a case where it is determined to be another object type, the flow proceeds to step S914.

In step S914, the imaging evaluating unit 208 sets the first in-focus determining threshold that is basically selected, to an in-focus determining threshold as an in-focus determining criterion for each optical system of the compound-eye optical system. After the in-focus determining threshold is set, the flow proceeds to step S928.

In step S915, the imaging evaluating unit 208 sets a third in-focus determining threshold, which has a large value based on a criterion laxer than that of the first in-focus determining threshold, to an in-focus determining threshold as an in-focus determining criterion for each optical system of the compound-eye optical system. This is a condition under which the main object in the focus detecting area of each optical system is determined to be a vehicle, and generally, a vehicle is more likely to be captured as the same object with a longer depth than that of another object. Therefore, even if there is a difference between the focus position after focus control and the in-focus position, there is a higher possibility that the vehicle as the main object is in focus somewhere than other objects. In a case where the main object is a vehicle, the parallax of the compound-eye optical system is easily noticeable due to the long depth, and the in-focus degree in each optical system is likely to vary. Therefore, this embodiment sets the third in-focus determining threshold to facilitate the in-focus determination. After setting, the flow proceeds to step S928.

In step S916, the imaging evaluating unit 208 sets a second in-focus determining threshold, which substantially invalidates the in-focus determination, to an in-focus determining threshold as the in-focus determining criterion for a part of the optical systems in which the occlusion by another object or luminance abnormality has been detected among the optical systems in the compound-eye optical system. The second in-focus determining threshold is specifically expressed as a value of ∞ or a maximum value that can be set. The imaging evaluating unit 208 also sets a third in-focus determining threshold, which has a large value based on a criterion laxer than that of the first in-focus determining threshold, to an in-focus determining threshold as an in-focus determining criterion for the remaining optical systems in the compound-eye optical system. After the in-focus determining threshold is set, the flow proceeds to step S928.

Step S917 is a processing step that is operated in a case where the occlusion by another object, or a high luminance area or a low luminance area of a predetermined area or a predetermined area ratio or more exists in all optical systems to be focus-detected in the compound-eye optical system, or the type of object of each optical system is not the same. In this step, the imaging evaluating unit 208 sets a value of 0 to in-focus determining thresholds as in-focus determining criteria for all the optical systems to be focus-detected in the compound-eye optical system. By setting the value 0, in a case where the in-focus determining range is determined in the subsequent processing step, there is no in-focus determining range, which substantially causes out-of-focus determination. After the in-focus determining threshold is set, the flow proceeds to step S928.

Steps S918 to S927 are operations performed in a case where the in-focus evaluating mode recognized by the imaging evaluating unit 208 is the partial in-focus evaluating mode in which in-focus determination is performed substantially based only on the focus detecting result of a part of the optical system in the compound-eye optical system. In these processing steps, the imaging evaluating unit 208 performs various imaging evaluations, which will be described later, according to the selected in-focus evaluating mode, and determines one representative optical system that is most suitable for the in-focus evaluation by the imaging evaluating unit 208. Then, the imaging evaluating unit 208 makes different the in-focus determining threshold for the optical system that is most suitable for the in-focus evaluation from the in-focus determining threshold for the remaining optical system. Then, the in-focus determining unit 209 performs in-focus determination based on the optical system that is substantially most suitable for the in-focus evaluation. A description will now be given of each processing of steps S918 to S927 that performs the above operations.

In step S918, the imaging evaluating unit 208 determines whether the occluding condition by another object in step S904 is satisfied in all optical systems to be focus-detected. In a case where the imaging evaluating unit 208 determines that the occluding condition is satisfied in all optical systems to be focus-detected, the flow proceeds to step S917 in order to substantially change the in-focus determination to an out-of-focus determination. On the other hand, in a case where the imaging evaluating unit 208 determines that the occluding condition is not satisfied in at least one of the optical systems to be focus-detected, the flow proceeds to step S919.

Step S919 is a processing step that is performed in a case where there is at least one optical system that is determined not to satisfy the condition described in step S918 in the compound-eye optical system. In step S919, the imaging evaluating unit 208 generates a luminance histogram in pixel units for each focus detecting area in the optical system that does not meet the condition in step S918 among the optical systems to be focus-detected in the compound-eye optical system. In the luminance histogram, the count is divided at a border between a predetermined high luminance and a predetermined low luminance for determining at least a luminance abnormality. The count may be divided into finer luminance gradations. An example of the predetermined high luminance is a value such as 230 or 240 in a case where the luminance of the digital imaging data is expressed in 8-bit depth from 0 to 255. An example of the predetermined low luminance is a value such as 20 or 10, while the minimum luminance value based on the dark current of the image sensor is a value of 0 in a case where the luminance of the digital imaging data is expressed in 8-bit depth from 0 to 255. After the luminance histogram is generated, the flow proceeds to step S920.

In step S920, it is evaluated whether or not a high luminance area equal to or higher than a predetermined high luminance level or a low luminance area equal to or lower than a predetermined low luminance level is included by a predetermined area or more or a predetermined area ratio or more to the focus detecting area in pixel units in each focus detecting area of the optical system. The evaluation is performed by the imaging evaluating unit 208. Each of the predetermined area ratio and the predetermined area has two types of thresholds, a first area ratio threshold or a first area threshold, and a second area ratio threshold or a second area threshold, which will be described later and are stored in the imaging evaluating unit 208. An example of the predetermined area ratio or the predetermined area is a first area ratio threshold that has an intermediate value such as 30% or 40% of the area of the focus detecting area expressed in pixel units, or a first area threshold that has the same area as this threshold, or a second area ratio threshold that is an almost extreme value larger than the first area ratio threshold, such as almost 100%, or a second area threshold that has the same area as this threshold.

In a case where the imaging evaluating unit 208 determines that the second area threshold or more or the second area ratio or more is satisfied in each focus detecting area of the optical system, the flow proceeds to step S917 in order to substantially change the in-focus determination to an out-of-focus determination. In a case where the imaging evaluating unit 208 determines that the first area threshold or more the first area ratio threshold or more is satisfied in each focus detecting area of the optical system, excluding the condition for proceeding to step S917, the flow proceeds to step S927. In other cases, the flow proceeds to step S921. Step S908 is a similar processing step, but this step is different from step S908 in the determination condition regarding whether a high luminance area or a low luminance area is included. This is because the operations of steps S918 to S926, including this step differ from the operations of steps S906 to S916 including step S908, in that one representative optical system that is most suitable for in-focus evaluation by the imaging evaluating unit 208 is determined.

Step S921 is a processing step that is performed in a case where there is at least one optical system that is determined not to meet the luminance condition described in step S920 in the compound-eye optical system. In step S921, in the optical system that does not satisfy the condition in step S920 among the optical systems to be focus-detected in the compound-eye optical system, the imaging evaluating unit 208 acquires information on the approximately corresponding object distance based on the focus position of the main object of each optical system from the drive characteristic information recorder 104. After the information is acquired, the flow proceeds to step S922.

In step S922, the imaging evaluating unit 208 evaluates whether a distance condition is satisfied in a main object in each focus detecting area of the optical system, in which the acquired object distance is closer than a predetermined object distance threshold and the parallax between the optical images of the compound-eye optical system is greater than a predetermined value. The parallax between the optical images of the compound-eye optical system is affected by a base length between the optical systems in the compound-eye optical system and an object distance. In a case where the farthest one of the obtained object distances in the optical systems is closer than the predetermined object distance threshold, the flow proceeds to step S927. Otherwise, the flow proceeds to step S923.

Step S923 is a processing step that is performed in a case where there is at least one optical system that does not satisfy the distance condition described in step S922. In step S923, the imaging evaluating unit 208 determines a predetermined object type from the feature points of color and luminance of each object image of each optical system in the compound-eye optical system that does not meet the distance condition of step S922, using a known object recognition method. More specifically, the imaging evaluating unit 208 determines whether the object to be focus-detected is a person's face or pupil, or a vehicle such as a train, four-wheeled vehicle, or two-wheeled vehicle. After the object type is determined, the flow proceeds to step S924.

In step S924, it is determined whether the object types determined in the optical systems that do not meet the distance condition of step S922 are the same. In a case where there are a plurality of optical systems that do not meet the distance condition in step S922 and the object types are not the same, different object images are focus-detected among the optical systems due to parallax, etc., and unified focus control for the same object cannot be achieved as a compound-eye optical system. In a case where the object types in the optical systems that do not meet the condition are not the same, the flow proceeds to step S917 in order to substantially change the in-focus determination to an out-of-focus determination. In a case where there is a single optical system that does not meet the condition in step S922, or in a case where there are a plurality of optical systems that do not meet the condition and it is determined in step S922 that the object types are the same, the flow proceeds to step S925.

In step S925, in the optical system(s) that does not meet the condition in step S922, it is determined whether the object type of the object image of each optical system determined by the imaging evaluating unit 208 is a vehicle such as a train, four-wheeled vehicle, or two-wheeled vehicle. In a case where the object type is the vehicle, the flow proceeds to step S927. On the other hand, in a case where the object type is determined to be another object type, the flow proceeds to step S926.

Step S926 is a processing step that is performed in a case where there is at least one optical system that is determined not to satisfy the object type condition in step S925 in the compound-eye optical system. In step S926, the optical system with the smallest detected defocus amount among the optical systems that are determined not to satisfy the object type condition in step S925 is set to a representative optical system, and the imaging evaluating unit 208 sets different in-focus determining thresholds to the representative optical system and the other optical system. More specifically, the imaging evaluating unit 208 sets the in-focus determining threshold for the representative optical system to a first in-focus determining threshold that is basically selected. The imaging evaluating unit 208 also sets the in-focus determining threshold for the other optical system in the compound-eye optical system excluding the representative optical system to a second in-focus determining threshold that substantially invalidates the in-focus determination. Due to this setting, the imaging evaluating unit 208 can make different the in-focus determining threshold for the optical system most suitable for the in-focus evaluation from the in-focus determining threshold for the remaining optical systems. After the in-focus determining threshold is set, the flow proceeds to step S928.

Step S927 is a processing step that is performed in a case where there is at least one optical system that is determined to satisfy the condition in step S922 in the compound-eye optical system, or in a case where the optical system is determined to satisfy the condition in step S925. In step S927, among the optical systems that are subject to the condition determination in the previous step, the imaging evaluating unit 208 sets the optical system with the smallest detected defocus amount to the representative optical system, and sets different in-focus determining thresholds to the representative optical system and the other optical systems. More specifically, the imaging evaluating unit 208 sets the in-focus determining threshold for the representative optical system to a third in-focus determining threshold that has a larger value based on a criterion laxer than that of the first in-focus determining threshold that is basically selected. In addition, the imaging evaluating unit 208 sets the in-focus determining threshold for the other optical system in the compound-eye optical system except for the representative optical system to a second in-focus determining threshold that substantially invalidates the in-focus determination. Due to this setting, the imaging evaluating unit 208 can make different the in-focus determining threshold for the optical system that is most suitable for focus evaluation from the in-focus determining threshold for the remaining optical system. After the in-focus determining threshold is set, the flow proceeds to step S928.

In step S928, the in-focus determining unit 209 determines the in-focus determining range based on the in-focus determining threshold as the in-focus determining criterion for each optical system in the compound-eye optical system. More specifically, the in-focus determining unit 209 determines the in-focus determining range having a range width expressed by the positive and negative values of the in-focus determining threshold expressed in an absolute value, and a range center at the in-focus position based on the focus detecting result of the focus detector 206. After the in-focus determining range is determined, the flow proceeds to step S929.

In step S929, the in-focus determining unit 209 compares and determines whether the defocus amount detected in the predetermined focus detecting area of each optical system is within the in-focus determining range determined in step S928. In a case where both defocus amounts are within the in-focus determining range, the flow proceeds to step S930. Otherwise, this flow ends. In step S930, the notification unit 210 notifies the user of the in-focus state by a predetermined sound or display, and the flow ends.

Due to the above in-focus determining criterion determining operation, even if a difference occurs in the in-focus degree among object images of the compound-eye optical system due to the influence of parallax, the imaging situation is automatically evaluated, and the in-focus notification can be properly performed based on the influence of parallax of the compound-eye optical system. Due to the proper in-focus notification, for example, in continuous imaging operations by continuously operating SW2, the camera can automatically and properly transition to imaging operations after focus control.

Variation

In this embodiment, in step S913, the imaging evaluating unit 208 changes the setting of the in-focus determining threshold depending on whether or not the type of main object in the focus detecting area of each optical system is a vehicle. However, this embodiment is not limited to this example, and the imaging evaluating unit 208 may change the setting of the in-focus determining threshold according to whether the type of main object in the focus detecting area of each optical system is a face (or a pupil). More specifically, in a case where the main object is a face or pupil, a slight focus shift tends to be more easily noticeable than other objects. Therefore, in a case where the main object is a face or pupil, a fourth in-focus determining threshold that is stricter (more rigorous) than that of the first in-focus determining threshold that is basically selected may be newly created and set.

This setting can set an in-focus determining threshold based on the influence of parallax of the compound-eye optical system for general objects, and a strict in-focus determining threshold for an object such as a face and pupil, whose focus shift tends to be easily noticeable, regardless of the influence of parallax.

Other Variations

The above embodiments illustrate a digital camera in which each object image of the compound-eye optical system is incident on a single imaging unit 202. That is, the imaging unit 202 has a single image sensor that captures the object images formed by the left optical system 110 and the right optical system 120 in different areas. However, each embodiment is not limited to this example, and object images of the compound-eye optical system may enter a plurality of independent imaging units. That is, the imaging unit 202 may have a first image sensor configured to capture an object image formed by the left optical system 110 and a second image sensor configured to capture an object image formed by the right optical system 120.

In each embodiment, a digital camera has a twin-lens optical system as an example of a compound-eye optical system in which a plurality of different optical systems are provided in a single lens barrel. However, each embodiment is not limited to this example, and can be similarly applied to a digital camera having three or more optical systems.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each embodiment can provide an image pickup apparatus that can properly perform in-focus determination by using a reference value according to an imaging condition for each of a plurality of optical systems in a compound-eye optical system.

This application claims priority to Japanese Patent Application No. 2023-138540, which was filed on Aug. 29, 2023, and which is hereby incorporated by reference herein in its entirety.

What is claimed is:

1. An image pickup apparatus comprising:
an imaging unit configured to capture an object image formed by each of a first optical system and a second optical system arranged in parallel with the first optical system, the first optical system and the second optical system being included in a compound-eye optical system;
a processor configured to:
detect a defocus amount of each of the first optical system and the second optical system regarding the object image, and
evaluate an imaging state regarding the object image by setting a first reference value that is used to determine an in-focus state of the first optical system and a second reference value that is used to determine an in-focus state of the second optical system according to the imaging state; and
a notification unit configured to notify a user of the in-focus state in a case where each of the first optical system and the second optical system is determined to be in the in-focus state.

2. The image pickup apparatus according to claim 1, wherein the processor is configured to:
determine a focus state of each of the first optical system and the second optical system,
determine that the first optical system is in the in-focus state in a case where the defocus amount of the first optical system is within a first range that is set using the first reference value, and
determine that the second optical system is in the in-focus state in a case where the defocus amount of the second optical system is within a second range that is set using the second reference value.

3. The image pickup apparatus according to claim 1, wherein the processor is configured to evaluate the imaging state based on the defocus amount of each of the first optical system and the second optical system.

4. The image pickup apparatus according to claim 1, wherein the processor is configured to evaluate the imaging state based on an F-number of each of the first optical system and the second optical system.

5. The image pickup apparatus according to claim 1, wherein the processor is configured to:

identify an imaging area of an object, determine whether or not an occlusion has occurred in the imaging area due to another object being mixed in front of the imaging area, and change at least one of the first reference value and the second reference value in a case where the occlusion of a predetermined area ratio or more has occurred in the imaging area so as to facilitate a determination of the in-focus state.

6. The image pickup apparatus according to claim 1, wherein the processor is configured to evaluate the imaging state based on whether the object image includes a high-luminance area or a low-luminance area of a predetermined area or more.

7. The image pickup apparatus according to claim 1, wherein the processor is configured to change at least one of the first reference value and the second reference value so as to facilitate a determination of the in-focus state in a case where the object image includes a high-luminance area or a low-luminance area of a predetermined area or more.

8. The image pickup apparatus according to claim 1, wherein the processor is configured to:

extract feature points of the object image;

determine an object type; and evaluate the imaging state based on the object type.

9. The image pickup apparatus according to claim 8, wherein the processor is configured to change at least one of the first reference value and the second reference value so as to hinder a determination of the in-focus state in a case where the object type is a face of a person.

10. The image pickup apparatus according to claim 8, wherein the processor is configured to change at least one of the first reference value and the second reference value so as to facilitate a determination of the in-focus state in a case where the processor determines that the object type is a vehicle.

11. The image pickup apparatus according to claim 1, wherein the processor is configured to:

determine a distance between the image pickup apparatus and an object using a focus position of at least one of the first optical system and the second optical system and an output signal from the processor, and change at least one of the first reference value and the second reference value so as to facilitate a determination of the in-focus state in a case where the distance is smaller than a predetermined distance threshold.

12. The image pickup apparatus according to claim 1, wherein the first optical system to which the first reference value is set is more focused than the second optical system to which the second reference value is set.

13. The image pickup apparatus according to claim 1, wherein the second reference value is set so that the in-focus state is more likely to be determined than the first reference value.

14. The image pickup apparatus according to claim 1, wherein the imaging unit includes:

a first image sensor configured to capture the object image formed by the first optical system; and a second image sensor configured to capture the object image formed by the second optical system.

15. The image pickup apparatus according to claim 1, wherein the imaging unit includes a single image sensor configured to capture object images formed in different areas by the first optical system and the second optical system.

16. A control method for an image pickup apparatus, the control method comprising the steps of:

capturing an object image formed by each of a first optical system and a second optical system arranged in parallel with the first optical system, the first optical system and the second optical system being included in a compound-eye optical system;

detecting a defocus amount of each of the first optical system and the second optical system regarding the object image;

evaluating an imaging state regarding the object image by setting a first reference value that is used to determine an in-focus state of the first optical system and a second reference value that is used to determine an in-focus state of the second optical system according to the imaging state; and notifying a user of the in-focus state in a case where each of the first optical system and the second optical system is determined to be in the in-focus state.

17. A non-transitory computer-readable storage medium storing a program for causing a computer to execute the control method according to claim 16.

* * * * *